(12) United States Patent
Nogami

(10) Patent No.: US 10,289,876 B2
(45) Date of Patent: May 14, 2019

(54) RESPONDER, INTERROGATOR, METHOD OF CONTROLLING RESPONDER, METHOD OF CONTROLLING INTERROGATOR, INFORMATION PROCESSING PROGRAM, AND RECORDING MEDIUM

(71) Applicant: OMRON Corporation, Kyoto (JP)

(72) Inventor: Hidekatsu Nogami, Kusatsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/839,869

(22) Filed: Dec. 13, 2017

(65) Prior Publication Data

US 2018/0260590 A1  Sep. 13, 2018

(30) Foreign Application Priority Data

Mar. 10, 2017 (JP) ................................. 2017-046595

(51) Int. Cl.
*G06K 7/10* (2006.01)
(52) U.S. Cl.
CPC ................................ *G06K 7/10029* (2013.01)
(58) Field of Classification Search
None
See application file for complete search history.

(56) References Cited

U.S. PATENT DOCUMENTS

| 8,653,947 | B2 * | 2/2014 | Zhang | G06K 7/10039 340/10.1 |
| 8,948,279 | B2 * | 2/2015 | Volpi | G06K 7/0008 375/260 |
| 8,979,638 | B2 * | 3/2015 | Emori | G06K 7/10039 463/25 |
| 9,361,568 | B2 * | 6/2016 | Butler | H04L 67/1097 |
| 2010/0106356 | A1 * | 4/2010 | Trepagnier | G01S 17/023 701/25 |
| 2012/0075075 | A1 * | 3/2012 | Du | G06K 7/0008 340/10.2 |

FOREIGN PATENT DOCUMENTS

JP    H11282975    10/1999

OTHER PUBLICATIONS

"Office Action of German Counterpart Application", dated Jan. 7, 2019, with English translation thereof, p. 1-p. 18.

* cited by examiner

*Primary Examiner* — K. Wong
(74) *Attorney, Agent, or Firm* — JCIPRNET

(57) ABSTRACT

An interrogator receives a response from a responder that has detected a predetermined state with priority among responses from a plurality of responders. A tag determines a time slot selected in a case in which a sensor has detected a predetermined state to be a time slot earlier than a time slot selected in a case in which the sensor has not detected the predetermined state.

8 Claims, 6 Drawing Sheets

RESPONDER, INTERROGATOR, METHOD OF CONTROLLING RESPONDER, METHOD OF CONTROLLING INTERROGATOR, INFORMATION PROCESSING PROGRAM, AND RECORDING MEDIUM

CROSS-REFERENCE TO RELATED APPLICATION

This application claims the priority benefit of Japanese application serial no. 2017-046595, filed on Mar. 10, 2017. The entirety of the above-mentioned patent application is hereby incorporated by reference herein and made a part of this specification.

BACKGROUND

Technical Field

The disclosure relates to a responder having an anti-collision function of a time slot system and the like.

Description of Related Art

Conventionally, management of target objects using responders such as radio frequency identification (RFID) tags has been widely used. For example, in Patent Document 1 presented below, a technology for setting the number of time slots assigned from an interrogator to responders to an optimal value for highest reading efficiency when the interrogator such as an RFID reading device receives responses from a plurality of responders is disclosed.

[Patent Document 1] Japanese Unexamined Patent Application Publication No. 11-282975 (published on Oct. 15, 1999)

However, in the conventional technology as described above, there is a problem in that the interrogator cannot receive a response from a responder that has detected a predetermined state such as an abnormal state using a sensor or the like with priority among responses from a plurality of responders.

SUMMARY

According to one or some exemplary embodiments of the invention, a responder having an anti-collision function of a time slot system is provided. The responder includes: a judging unit that judges whether a sensor has detected a predetermined state; and a determination unit that determines a time slot selected in a case in which the sensor is judged to have detected the predetermined state by the judging unit to be a time slot earlier than a time slot selected in a case in which the sensor is judged not to have detected the predetermined state by the judging unit.

According to one or some exemplary embodiments of the invention, an interrogator that has an anti-collision function of a time slot system and communicates with each of a plurality of responders is provided. The interrogator includes: a reception judging unit that judges whether a response received in a time slot that has a predetermined value or less in an order is present among responses from the plurality of responders; and a designation unit that designates the number of time slots that can be selected by each of the plurality of responders to be a predetermined reference value or less in a case in which a response received in a time slot that has the predetermined value or less in the order is judged to be present by the reception judging unit.

According to one or some exemplary embodiments of the invention, a method of controlling a responder having an anti-collision function of a time slot system is provided. The method includes: judging whether a sensor has detected a predetermined state; and determining a time slot selected in a case in which the sensor is judged to have detected the predetermined state in the judging of whether a sensor has detected a predeteiinined state to be a time slot earlier than a time slot selected in a case in which the sensor is judged not to have detected the predetermined state in the judging of whether a sensor has detected a predetermined state.

According to one or some exemplary embodiments of the invention, a method of controlling an interrogator that has an anti-collision function of a time slot system and communicates with each of a plurality of responders is provided. The method includes: judging whether a response received in a time slot that has a predetermined value or less in an order is present among responses from the plurality of responders; and designating the number of time slots that can be selected by each of the plurality of responders to be a predetermined reference value or less in a case in which a response received in a time slot that has the predetermined value or less in the order is judged to be present in the judging of whether a response is present.

DESCRIPTION OF THE EMBODIMENTS

Figure 1:
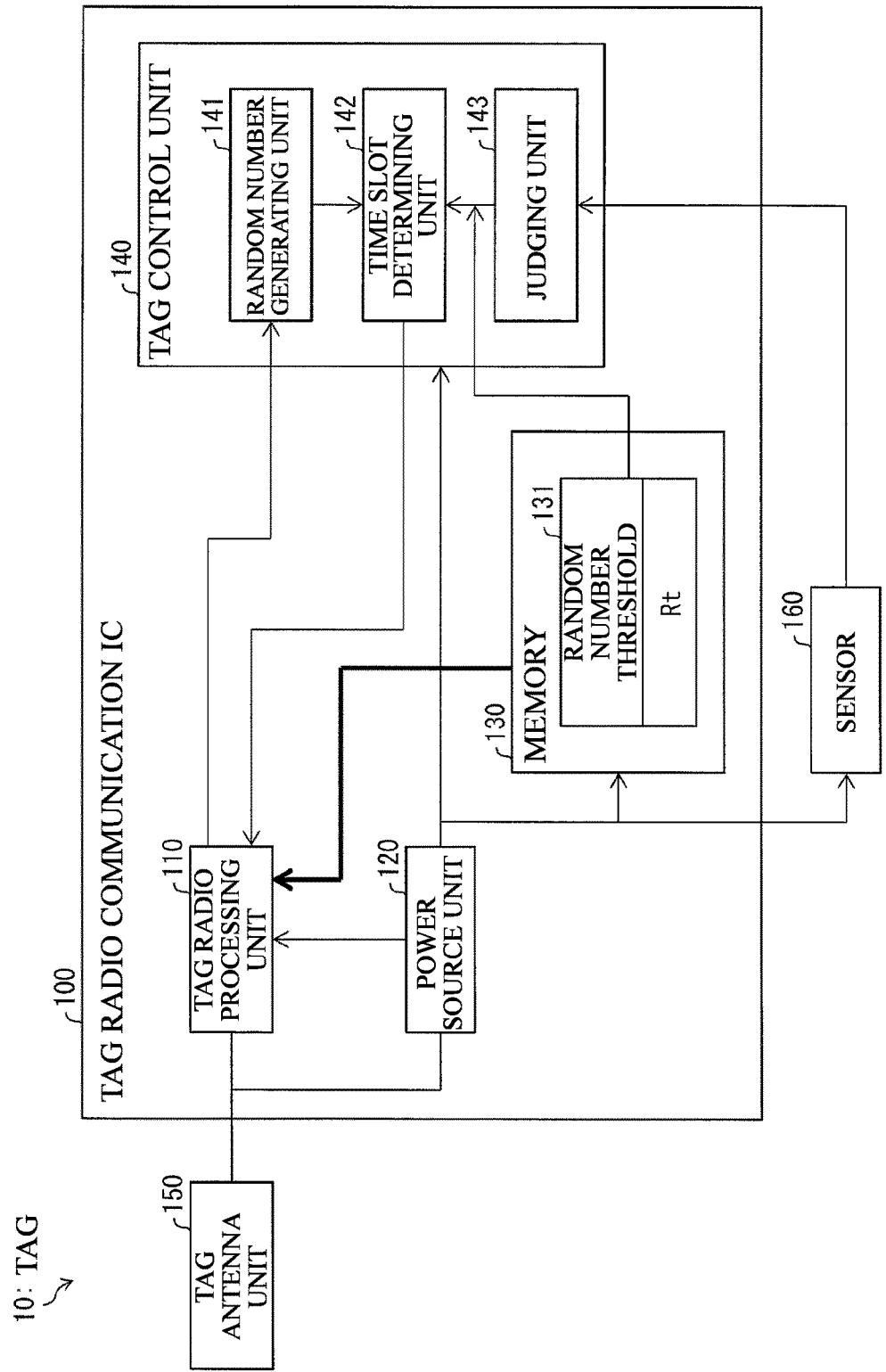
FIG. 1 is a block diagram illustrating the main configuration of an RFID tag according to Embodiment 1 of the invention.

According to one or some exemplary embodiments of the invention, a responder or the like is realized, which enables an interrogator to receive a response from a responder, which has detected a predetermined state such as an abnormal state using a sensor, with priority among responses from a plurality of responders.

According to one or some exemplary embodiments of the invention, a responder having an anti-collision function of a time slot system is provided. The responder includes: a judging unit that judges whether a sensor has detected a predetermined state; and a determination unit that determines a time slot selected in a case in which the sensor is judged to have detected the predetermined state by the judging unit to be a time slot earlier than a time slot selected in a case in which the sensor is judged not to have detected the predetermined state by the judging unit.

According to the configuration described above, the responder determines a time slot selected in a case in which the sensor is judged to have detected the predetermined state to be a time slot earlier than a time slot selected in a case in which the sensor is judged not to have detected the predetermined state. In other words, a responder judged to have detected the predetermined state using the sensor among a plurality of responders responds in a time slot that is earlier than a time slot in which a responder judged not to have detected the predetermined state using the sensor responds.

Accordingly, the responders have an effect of enabling a response from a responder of which the sensor is judged to have detected the predetermined state such as an abnormal state to be received with priority by the interrogator over a response from a responder of which the sensor is judged not to have detected the predetermined state such as an abnormal state.

In the responder according to one or some exemplary embodiments of the invention, the determination unit may (1) determine the time slot selected in a case in which the sensor is judged to have detected the predeteiinined state by the judging unit to be a time slot matching a random number having a value smaller than a predetermined threshold and (2) determine the time slot selected in a case in which the sensor is judged not to have detected the predetermined state by the judging unit to be a time slot matching a random number having a value that is the predetermined threshold or more.

According to the configuration described above, the responder (1) determines the time slot selected in a case in which the sensor is judged to have detected the predetermined state to be a time slot matching a random number having a value smaller than a predetermined threshold. On the other hand, the responder (2) determines the time slot selected in a case in which the sensor is judged not to have detected the predetermined state to be a time slot matching a random number having a value that is the predetermined threshold or more. In other words, the responder determines a time slot selected in a case in which the sensor is judged to have detected the predetermined state to be a time slot earlier than a time slot selected in a case in which the sensor is judged not to have detected the predetermined state. For this reason, a responder judged to have detected the predetermined state using the sensor among a plurality of responders responds in a time slot that is earlier than a time slot in which a responder judged not to have detected the predetermined state using the sensor responds.

Accordingly, the responders have an effect of enabling a response from a responder of which the sensor is judged to have detected the predetemiined state such as an abnormal state to be received with priority by the interrogator over a response from a responder of which the sensor is judged not to have detected the predetermined state such as an abnormal state.

The responder according to one or some exemplary embodiments of the invention may include the sensor.

According to the configuration described above, the responder includes the sensor, in other words, the responder is a sensor-attached responder. Accordingly, the responders have an effect of enabling a response from a responder of which the sensor included in its own device is judged to have detected the predetermined state such as an abnormal state to be received with priority by the interrogator over a response from a responder of which the sensor included in its own device is judged not to have detected the predetermined state such as an abnormal state.

According to one or some exemplary embodiments of the invention, an interrogator that has an anti-collision function of a time slot system and communicates with each of a plurality of responders is provided. The interrogator includes: a reception judging unit that judges whether a response received in a time slot that has a predetermined value or less in an order is present among responses from the plurality of responders; and a designation unit that designates the number of time slots that can be selected by each of the plurality of responders to be a predetermined reference value or less in a case in which a response received in a time slot that has the predetennined value or less in the order is judged to be present by the reception judging unit.

According to the configuration described above, the interrogator designates the number of time slots that can be selected by each of the plurality of responders to be a predetermined reference value or less in a case in which a response received in a time slot that has the predetermined value or less in the order is judged to be present. In other words, in a case in which a response received in a time slot that has the predetermined value or less in the order is judged to be present, the interrogator limits the responders that can respond to the interrogator.

For example, in a case in which only the responder that has detected a predetermined state using the sensor can respond in a time slot that has the predetermined value or less in the order, the interrogator limits the responder that can respond to the interrogator, for example, to the responder that has detected the predetermined state using the sensor.

Accordingly, the interrogator has an effect of being capable of receiving a response from the responder that has detected the predetermined state using the sensor with priority over a response from the responder that has not detected the predetermined state using the sensor.

According to one or some exemplary embodiments of the invention, a method of controlling a responder having an anti-collision function of a time slot system is provided. The method includes: judging whether a sensor has detected a predetermined state; and determining a time slot selected in a case in which the sensor is judged to have detected the predetermined state in the judging of whether a sensor has detected a predetermined state to be a time slot earlier than a time slot selected in a case in which the sensor is judged not to have detected the predetermined state in the judging of whether a sensor has detected a predetennined state.

According to the control method described above, the responder determines a time slot selected in a case in which the sensor is judged to have detected the predetermined state to be a time slot earlier than a time slot selected in a case in which the sensor is judged not to have detected the predetermined state. In other words, a responder judged to have detected the predetermined state using the sensor among a plurality of responders responds in a time slot that is earlier than a time slot in which a responder judged not to have detected the predetermined state using the sensor responds.

Accordingly, the control method has an effect of enabling a response from a responder of which the sensor is judged to have detected the predetermined state such as an abnormal state to be received with priority by the interrogator over a response from a responder of which the sensor is judged not to have detected the predetermined state such as an abnoiiiiial state.

According to one or some exemplary embodiments of the invention, a method of controlling an interrogator that has an anti-collision function of a time slot system and communicates with each of a plurality of responders is provided. The method includes: judging whether a response received in a time slot that has a predetermined value or less in an order is present among responses from the plurality of responders; and designating the number of time slots that can be selected by each of the plurality of responders to be a predetermined reference value or less in a case in which a response received in a time slot that has the predetermined value or less in the order is judged to be present in the judging of whether a response is present.

According to the control method, the interrogator designates the number of time slots that can be selected by each of the plurality of responders to be a predetermined reference value or less in a case in which a response received in a time slot that has the predetermined value or less in the order is judged to be present among responses from the plurality of responders. In other words, in a case in which a response received in a time slot that is the predetermined value or less is judged to be present, the interrogator limits the responders that can respond to the interrogator.

For example, in a case in which only the responder that has detected a predetermined state using the sensor can respond in a time slot that is the predetermined value or less in the order, the interrogator limits the responder that can respond to the interrogator, for example, to the responder that has detected the predetermined state using the sensor.

Accordingly, the control method described above has an effect of enabling a response to be received from the responder that has detected the predetermined state using the sensor with priority over a response from the responder that has not detected the predetermined state using the sensor.

According to one or some exemplary embodiments of the invention, an effect of enabling an interrogator to receive a response from a responder, which has detected a predetermined state such as an abnormal state using a sensor, with priority among responses from a plurality of responders is acquired.

[Embodiment 1]

Hereinafter, Embodiment 1 of the invention will be described in detail with reference to FIGS. 1 to 6. In the drawings, the same reference numerals are assigned to parts that are the same as or correspond to each other, and the description thereof will not be repeated. For easy understanding of a radio frequency identification (RFID) tag 10 (responder) and an RFID reader/writer 20 (interrogator) according to one or some exemplary embodiments of the invention, first, an overview of a communication management system 1 including both will be described with reference to FIGS. 2A and 2B. To simplify the description, hereinafter, "RFID tag" will be simply referred to only as "tag." Similarly, "RFID reader/writer" will be referred to only as "reader."

(Overview of Communication Management System According to Embodiment 1)

Figure 2A:
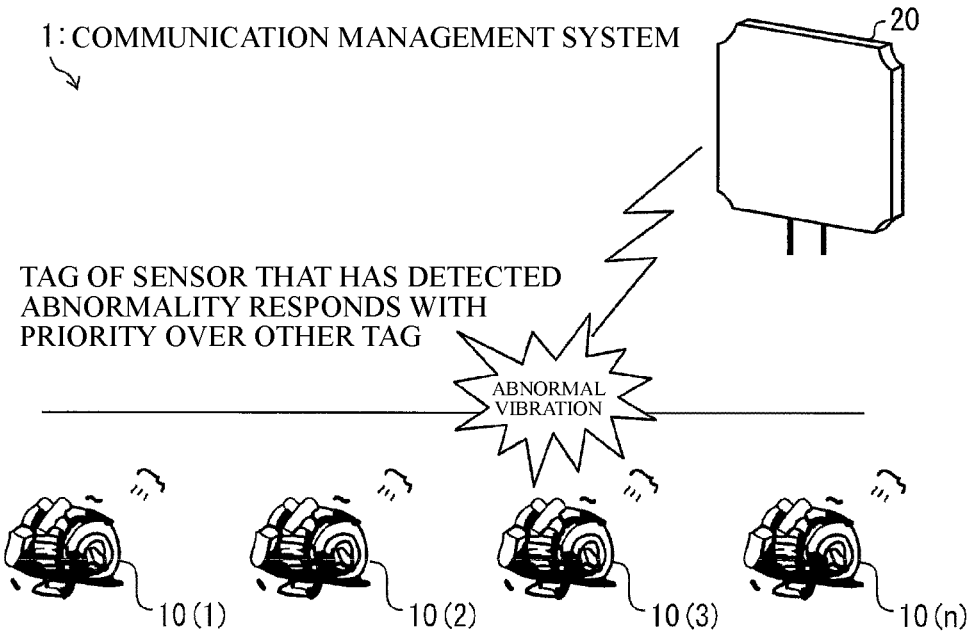
FIGS. 2A and 2B are diagrams illustrating overviews of a communication management system according to this embodiment and a conventional communication management system.
Figure 2B:
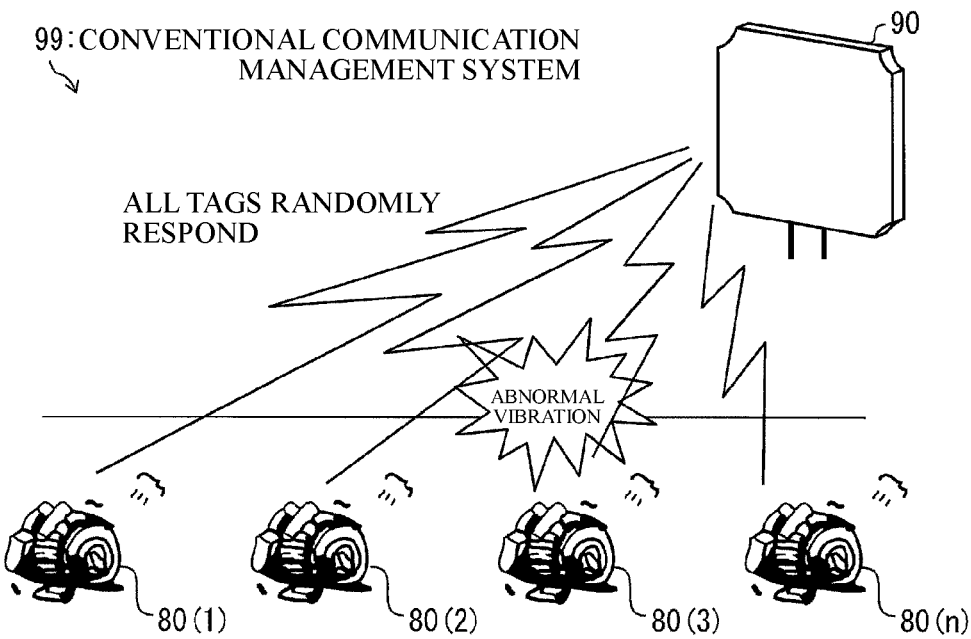

FIGS. 2A and 2B are diagrams illustrating overviews of a communication management system 1 having an anti-collision function of a time slot system and a conventional communication management system 99. FIG. 2A illustrates an overview of the communication management system 1 including a plurality of tags 10(1) to 10(n) and a reader 20, and FIG. 2B illustrates an overview of a conventional communication management system 99 including conventional tags 80(1) to 80(n) and a conventional reader 90. In this embodiment, "n" is an integer of one or more. When the tags 10(1) to 10(n) do not need to be particularly discriminated, they will be simply referred to as "tag 10," and similarly, when the conventional tags 80(1) to 80(n) do not need to be particularly discriminated, they will be simply referred to as "conventional tag 80."

For easy understanding of the communication management system 1, first, an overview of a conventional communication management system 99 employing an anti-collision function of a conventional and general time slot system will be described with reference to FIG. 2B.

(Conventional Communication Management System)

In the conventional communication management system 99 illustrated in FIG. 2B, the conventional tags 80(1) to 80(n) are, for example, arranged in a plurality of work pieces moving on a line. When a conventional reader 90 issues a query (read start command), all the conventional tags 80(1) to 80(n) disposed inside a communicable area for the conventional reader 90 respond to the conventional reader 90. Each of the conventional tags 80(1) to 80(n) includes a sensor and transmits identification infomation and sensing data (a detection result) of its own device to the conventional reader 90 in response to the query from the conventional reader 90. When responding to the reader 90, the conventional tag 80 transmits identification information and a detection result of its own device to the conventional reader 90, and the conventional reader 90 that has received the response from the conventional tag 80 acquires the identification information and the detection result of the conventional tag 80 that has responded.

Here, as in the conventional communication management system 99, in a case in which a plurality of conventional tags 80 respond to a query from one conventional reader 90, there is a possibility that the following event may occur. There are cases in which signals (responses) output from a plurality of conventional tags 80 for transmitting the identification information and the like of their own devices collide with each other, and the conventional reader 90 cannot read each of the plurality of conventional tags 80. In order to prevent collision of signals output from the plurality of conventional tags 80 and allow one conventional reader 90 to read the plurality of conventional tags 80 in a short time, the conventional communication management system 90 employs a collision prevention function (anti-collision function) of a time slot system.

The time slot system, also known as an ALOHA system, is an access control system controlling a response order of a communication medium, and is a representative algorithm employed in international standard specifications relating to anti-collision.

In other words, the conventional reader 90 issues a query including "a Q value (here, Q≥0) that is a numerical value used for designating the number of time slots that can be selected by each of a plurality of conventional tags 80." More specifically, the Q value designates the number of time slots in which the conventional tag 80 can respond as $2^Q$. The conventional tag 80 that has received a query generates a random number (pseudorandom number) in the range of "0" to "$2^Q-1$" by using the Q value included in the query. Then, the conventional tag 80 selects a time slot matching the generated random number (a time slot of a timing matching the random number) and responds to the conventional reader 90.

For example, in a case in which "Q value=3," $2^3=8=$ [1000], and accordingly, the conventional tag 80 generates a three-bit random number from [000] to [111] and responds to the conventional reader 90 in a time slot of the generated random number. In a case in which the conventional tag 80 that has received a query including "Q value=3" generates "010," the conventional tag 80 responds in a time slot of "010" among time slots of [000] to [111].

In description presented below, among time slots matching the random number (pseudorandom number) generated using the Q value, a time slot matching "00" will be referred to as "time slot T1," and a time slot matching "01" will be referred to as "time slot T2." Similarly, subsequently, a time slot matching "10" will be referred to as "time slot T3," and a time slot matching "11" will be referred to as "time slot T4," . . . . As a time slot has a smaller value of a corresponding random number, the slot is an earlier time slot (early time slot) in an order (transmission order). Thus, for example, the time slot T1 is earlier than the time slot T2.

Similarly, for example, in a case in which "Q value=4," $2^4=16=[10000]$, and thus the conventional tag 80 generates a four-bit random number from [0000] to [1111]. Then, the conventional tag 80 responds to the conventional reader 90 in the time slot of the generated random number. More specifically, in a case in which the conventional tag 80 that has received a query including "Q value=4" generates [0100], the conventional tag 80 responds to the conventional reader 90 in a time slot of "[0100]" among time slots [0000] to [1111].

At this time, in a case in which only one conventional tag 80 responds in one time slot, the response from the conventional tag 80 is received by the conventional reader 90. In contrast to this, in a case in which a plurality of conventional tags 80 respond at the same time in one time slot, such responses collide, and accordingly, the responses from such conventional tags 80 are not received by the conventional reader 90.

The conventional tag 80 of which the response has not been received by the conventional reader 90 due to the collision of responses generates a random number again, selects a time slot of a timing matching the generated random number, and responds to the conventional reader 90. As the conventional tag 80 repeats a series of processes of "generating a random number and responding in a time slot matching the generated random number," the conventional reader 90 can receive responses from a plurality of conventional tags 80 almost at the same time.

In the conventional communication management system 99, in a case in which the number of conventional tags 80 inside an antenna communication area of the conventional reader 90 is large, the conventional reader 90 increases the value of the Q value, thereby decreasing the number of times collision occur. On the other hand, in a case in which the number of conventional tags 80 is small, the conventional reader 90 decreases the value of the Q value, thereby shortening a time required for communicating with all the plurality of conventional tags 80.

As described above, in the conventional communication management system 99, each of the plurality of conventional tags 80 randomly determines "a response order (time slot) of its own device for the conventional reader 90." In other words, in the conventional communication management system 99, a response order (time slot) for the conventional reader 90 is randomly determined by each of the conventional tags 80(1) to 80(n).

For this reason, the conventional communication management system 99 cannot perceive "a conventional tag 80 of which the sensor 80 has detected a predetermined state such as an abnormal state among the plurality of conventional tags 80" only in the response order of each of the plurality of conventional tags 80. In other words, the conventional communication management system 99 cannot discriminate "a conventional tag 80 that has detected a predetermined state such as an abnormal state by using a sensor" and "a conventional tag 80 that has not detected the predetermined state" only in the response order of the conventional tag 80. Accordingly, in the conventional communication management system 99, it is necessary to perform a process for discriminating a conventional tag 80(3) (a conventional tag 80 that has detected abnormal vibration using a sensor) illustrated in FIG. 2B from the other conventional tags 80 by using an external device or the like.

In addition, there is a possibility that the conventional reader 90 cannot read all the responses from a plurality of conventional tags 80 in accordance with time out for a response from each of the plurality of conventional tags 80. Here, in the conventional communication management system 99, a response from "a conventional tag 80 including a sensor that has detected a predetermined state such as an abnormal state" is not prioritized over a response from "the other conventional tags 80." For this reason, there is a possibility that a response from "a conventional tag 80 including a sensor that has detected a predetermined state such as an abnormal state" cannot be received by the conventional reader 90 within a predetermined communication time between the conventional reader 90 and the conventional tags 80(1) to 80(n). In other words, there is a possibility that a response from "a conventional tag 80 including a sensor that has detected a predetermined state such as an abnormal state" cannot be received by the conventional reader 90 in accordance with timeout, and as a result, there is a possibility that the abnormal state cannot be detected.

(Communication Management System According to One or Some Exemplary Embodiments of the Invention)

<Process Executed by Tag>

Also in the communication management system 1 illustrated in FIG. 2A, the tags 10(1) to 10(n) are, for example, arranged at a plurality of work pieces moving on a line. In addition, the communication management system 1 employs an anti-collision function of the time slot system. In other words, the tag 10 that has received a query from the reader 20 generates a random number (pseudorandom number) within the range of "0" to "$2^Q-1$" by using a Q value included in the query. Then, the tag 10 selects a time slot matching the generated random number (a time slot of a timing matching the random number) and responds to the reader 20. In the following description, "selecting a time slot matching a random number (pseudorandom number) (a time slot of a timing matching a random number) generated using the Q value included in a query and responding" may be referred to as a "query response."

In the communication management system 1, when a sensor 160 detects a predetermined state such as an abnormal state, the tag 10 responds to the reader 20 in a time slot that is earlier than time slots of the other tags 10. In other words, when the sensor 160 detects a predetermined state such as an abnormal state, the tag 10 executes the query response early. On the other hand, at a normal time (in other words, in a case in which the sensor 160 has not detected the predetermined state), the tag 10 executes the query response late.

In the communication management system 1, time slots that may be used when the tag 10 responds to the reader 20 can be divided into "an abnormality detection-time time slot" and "a normal-time time slot." "The abnormality detection-time time slot" is a time slot matching a random number (pseudorandom number) that is generated using a Q value included in the query by the tag 10 and has a value smaller than a random number threshold Rt. "The normal-time time slot" is a time slot that matches a random number (pseudo random number) generated using a Q value included in the query by the tag 10 and matches a random number having a value that is the random number threshold Rt or more. In other words, "the time slot used at a normal time" is a time slot matching a random number that is generated using a Q value included in the query by the tag 10 and has the same value as the random number threshold Rt or a value larger than the random number threshold Rt. "The abnormality detection-time time slot" is a time slot coming earlier in the order (transmission order) than "the time slot used at a normal time," in other words, is an earlier time slot than "the normal-time time slot."

(A) In a case in which the sensor 160 detects a predetermined state such as an abnormal state, the tag 10 selects "abnormality detection-time time slot" and responds to the reader 20. (B) In a case in which the sensor 160 has not detected a predetermined state such as an abnormality state, the tag 10 selects "the normal-time time slot" and responds to the reader 20. At a normal time (in a case in which the sensor 160 has not detected a predetermined state), the tag 10 does not respond in "the abnormality detection-time time slot" but responds to the reader 20 in "the normal-time time slot." The tag 10 responds to the reader 20 in "the abnormality detection-time time slot" only in a case in which the sensor 160 detects the predetermined state.

For example, in a case in which "the random number threshold Rt=4," the tag 10 responds to the reader 20 in a time slot that matches the random number generated using the Q value and satisfies the following condition. In other words, (A) in a case in which the sensor 160 detects a predetermined state such as an abnormal state, the tag 10 responds to the reader 20 in a time slot T1 to T4 matching a random number having a value smaller than the random number threshold Rt=4=[100] (in other words, one of [00] to [11]). (B) In a case in which the sensor 160 has not detected a predetermined state such as an abnormal state, the tag 10 responds to the reader 20 in a time slot matching a random number having a value that is the random number threshold Rt=4=[100] or more (in other words, a time slot T5 or a later time slot).

In other words, only the tag 10 that has detected a predetermined state by using the sensor 160 can select the time slots T1 to T4, and the tag 10 that has not detected the predetermined state responds to the reader 20 in the time slot T5 or a later time slot.

A time slot selected by the tag 10 that has detected the predetermined state by using the sensor 160 (time slots T1 to T4) is earlier than a time slot selected by the tag 10 that has not detected the predetermined state by using the sensor 160 (the time slot T5 or a later time slot). Accordingly, the tag 10 can notify the reader 20 (and an external device such as a PLC, which is not illustrated in the drawing, connected to the reader 20) of the "occurrence of the predetermined state" in a speedy manner.

In addition, only the tag 10 that has detected the predetermined state by using the sensor 160 can select the time slots T1 to T4, and accordingly, there is a low possibility of collision in the time slots T1 to T4. In other words, the tag 10 selects the time slots T1 to T4 only in a case in which the predetermined state is detected using the sensor 160, and accordingly, the possibility of the occurrence of a collision of a response of a case in which the predetermined state is detected using the sensor 160 can be lowered.

In addition, the tag 10 that has detected the predetermined state using the sensor 160 responds in a time slot T1 to T4 earlier than the time slot T5, and accordingly, the possibility that the reader 20 cannot receive the response in accordance with timeout is low.

Accordingly, the reader 20 can receive a response of the tag 10 that has detected the predetermined state using the sensor 160 (in the example illustrated in FIG. 2, the tag 10(3)) earlier than responses from the tags 10 that have not detected the predetermined state (in the example illustrated in FIG. 2, the tags 10 other than the tag 10(3)).

In addition, the tag 10 can lower the possibility of collision of the response of the case in which the predetermined state has been detected using the sensor 160 and the possibility that the reader 20 cannot receive the response in accordance with timeout. Accordingly, the communication management system 1 can assuredly notify a user of the occurrence of the predetermined state such as an abnormal state, for example, through the reader 20, an external device such as a PLC, which is not illustrated in the drawing, connected to the reader 20, and the like.

In addition, the tag 10, similar to the conventional tag 80, transmits the identification information of its own device to the reader 20 when responding to the reader 20. When responding to the reader 20, the tag 10 may transmit a detection result acquired by the sensor 160 to the reader 20 in addition to the identification information of its own device. In correspondence with this, the reader 20 that has received the response from the tag 10 acquires the identification information of the tag 10 that has responded. The reader 20 that has received the response from the tag 10 may acquire the detection result acquired by the sensor 160 in addition to the identification information of the tag 10 that has responded.

<Process Performed by Reader>

In the communication management system 1, when a response from the tag 10 that has detected a predetermined state such as an abnormal state using a sensor 160 is received, the reader 20 sets a Q value of which the tag 10 is notified in accordance with a query to be small. More specifically, the reader 20 performs switching between a "normal mode (a mode in which a large Q value is set)" and an "abnormality detection mode (a mode in which a small Q value is set)" in accordance with a time slot in which the response from the tag 10 has been received.

In the communication management system 1, only the tag 10 that has detected a predetermined state such as an abnormal state using the sensor 160 can select a time slot (an abnormality detection-time time slot) matching a random number having a value smaller than the random number threshold Rt and respond to the reader 20. In other words, the tag 10 that has transmitted a response received by the reader 20 in a time slot matching a random number having a value smaller than the random number threshold Rt has detected a predetermined state such as an abnormal state using the sensor 160.

Accordingly, in the communication management system 1, in a case in which a response is received in a time slot matching a random number having a value smaller than the random number threshold Rt, the reader 20 can perceive that (A) a predetermined state such as an abnormal state has been detected using the sensor 160. In addition, the reader 20 can perceive a tag 10 (a sensor 160) that has detected the predetermined state from (B) identification information included in the response received in the time slot matching the random number having a value smaller than the random number threshold Rt. In a case in which a response is received in a time slot matching a random number having a value smaller than the random number threshold Rt, the reader 20 may notify an external device such as a PLC of (A) the occurrence of the predetermined state and (B) the identification information of the tag 10 (the sensor 160) that has detected the predetermined state.

The reader 20 according to the communication management system 1, unlike the conventional reader 90 of the conventional communication management system 99, perceives (A) the occurrence of the predetermined state and (B) the identification information of the tag 10 that has detected the predetermined state only from the time slot in which the response from the tag 10 has been received. In other words, the reader 20 does not need an external device used for perceiving (A) the occurrence of the predetermined state and (B) the identification information of the tag 10 that has detected the predetermined state. The reader 20 that has perceived (A) the occurrence of the predetermined state and (B) the identification information of the tag 10 that has detected the predetermined state only from the time slot in which the response has been received may perform alarming (warning), LED display, and the like relating to such information through an external device such as a PLC.

For a response from each of a plurality of tags 10, the reader 20 judges whether or not a predetermined state has been detected using the sensor 160 by using a "time slot determination value Ts" that is a time slot that comes earlier in the order than the time slot matching the random number threshold Rt. For example, in a case in which the random number threshold Rt=4=[100], in other words, a time slot matching the random number threshold Rt is T5, as the "time slot determination value Ts", one of the time slots T1 to T4 is selected.

Here, the "time slot determination value Ts" is a time slot (a time slot of which the order is one-time slot before the time slot matching the "random number threshold Rt") that is one-time slot before the time slot matching the "random number threshold Rt". In description presented below, the "time slot determination value Ts" is assumed to be a time slot that is one-time slot before the time slot matching the "random number threshold Rt". For example, in a case in which the random number threshold Rt=4=[100], the time slot determination value Ts is the time slot T4.

In a case in which the random number threshold Rt=4=[100], the tag 10 that has detected a predetermined state such as an abnormal state using the sensor 160 responds to the reader 20 in one of time slots T1 to T4 matching a random number (in other words, [00] to [11]) having a value smaller than [100]. In a case in which a response is received in a time slot of "time slot determination value Ts=time slot T4" or below, in other words, one of the time slots T1 to T4, the reader 20 judges that a predeteiiiiined state has been detected by the sensor 160.

The reader 20 judges whether a response received in a time slot (in other words, a time slot that is the same as the time slot determination value Ts or a time slot earlier than the time slot determination value Ts) that has the time slot determination value Ts or less in the order is present among responses from a plurality of tags 10.

(A) In a case in which it is judged that a response received in a time slot of the order of the time slot determination value Ts or less is not present, the reader 20 selects the normal mode and sets the Q value to be notified to the tag 10 using a query as Q1 (Q1>Q2≥0) that is "a normal-time Q value". In the normal mode, by setting "Q value =Q1 (for example, "Q1=16"), the reader 20 can receive all the responses from the plurality of tags 10. However, a time required for the reader 20 to receive all the responses from the plurality of tags 10 is long.

(B) In a case in which it is judged that a response received in a slot that has the time slot determination value Ts or less in the order is present, the reader 20 selects the abnormality detection mode and sets a Q value to be notified to the tag 10 using a query as Q2 that is "an abnormality detection-time Q value". In the abnormality detection mode, by setting "Q value=Q2 (for example, Q2=2)", the reader 20 receives only responses from limited tags 10 such as the tag 10 that has detected a predetermined state such as an abnormal state using the sensor 160 and the like.

For example, in a case in which the random number threshold Rt=4=[100] and Q2=2, the following process is performed in the communication management system 1. First, the reader 20 that is in the abnormality detection mode issues a query including "Q value=Q2=2".

Second, since $2^2$=[100], the tag 10 generates one of a random numbers [00] to [11] of two bits by using the Q value and responds to the reader 20 in a time slot of the generated random number. More specifically, the tag 10 responds to the reader 20 in one of a time slot T1=[00], T2=[01], T3=[03], and T4=[11]. Here, since the random number threshold Rt=4, the tag 10 that can select one of the time slots T1 to T4 is only the tag 10 that has detected a predetermined state such as an abnormal state using the sensor 160.

Accordingly, in the communication management system 1, in a case in which the random number threshold Rt=4, and Q2=2, only the tag 10 that has detected a predetermined state such as an abnormal state using the sensor 160 responds to the reader 20 that is in the abnormality detection mode.

In the communication management system 1, the reader 20 that has selected the abnormality detection mode sets a Q value to be notified to the tag 10 using a query to be smaller that of a case in which the normal mode is selected, thereby limiting tags 10 that can respond to the reader 20. For example, the reader 20 that has selected the abnormality detection mode issues a query including a Q value set such that only the tag 10 that has detected a predeteiinined state such as an abnormal state using the sensor 160 can respond to the reader 20.

More specifically, by issuing a query with the Q value set to Q2 satisfying "$2^{Q2}$=random number threshold Rt", the reader 20 can limit the tag 10 that can respond to a tag 10 that can select a time slot matching a random number having a value smaller than the random number threshold Rt. In other words, by issuing a query with the Q value set to Q2 satisfying "$2Q^2$ =random number threshold Rt", the reader 20 can limit the tag 10 that can respond to a tag 10 that has detected a predetermined state such as an abnormal state using the sensor 160.

For this reason, the reader 20 that has selected the abnormality detection mode can shorten a time required for communicating with all the tags 10 that can respond to the reader 20 to be less than a time required for communicating with all the tags 10 that can respond to the reader 20 in a case in which the normal mode is selected.

Accordingly, the reader 20 that has selected the abnormality detection mode can issue more queries in a unit time than those of a case in which the normal mode is selected and can communicate with all the tags 10 that can respond to the reader 20 more times. By communicating with all the tags 10 that can respond to the reader 20 more times in the unit time, the reader 20 that has selected the abnormality detection mode, for example, can acquire more desired information from all the tags 10 that can respond to the reader 20 and can acquire accurate information.

The reader 20 differently uses the normal mode and the abnormality detection mode and, in the abnormality detection mode in which a time required for communicating with all the tags 10 that can respond to the reader 20 once is short, increases the frequency (the number of times per unit time) of communicating with all the tags 10 that can respond to the reader 20. By increasing the frequency of communicating with all the tags 10 that can respond to the reader 20, the reader 20, for example, only from the tag 10 that has detected a predetermined state such as an abnormal state using the sensor 160, can acquire information relating to the predetermined state more in more details.

Each of the plurality of tags 10 determines a response order of its own device in accordance with the state of the sensor 160 (for example, detection/no-detection of a predetermined state such as an abnormality state). The tag 10 that has detected the predetermined state using the sensor 160 is prioritized to respond to the reader 20 over the tag 10 that has not detected the predetermined state. Since the tag 10 that has detected the predetermined state using the sensor 160 responds to the reader 20 earlier than the tag 10 that has not detected the predetermined state, even in a case in which the reader 20 designates a small Q value, the reader 20 can receive a response from the tag 10 that has detected the predetermined state. In addition, a response from the tag 10 that has detected a predetermined state such as an abnormal state using the sensor 160 is faster than a response from the tag 10 that has not detected the predetermined state, the tag 10 simplifies the process performed by the reader 20, and the amount of traffic can be decreased.

Furthermore, even in a case in which all the responses from the plurality of tags 10 cannot be read in accordance with timeout, the reader 20 can receive a response from the tag 10 that has detected a predetermined state such as an abnormal state using the sensor 160 with priority. In other words, the reader 20 can reduce a risk of not being able to receive a response from the tag 10, which has detected the predetermined state such as an abnoinial state using the sensor 160, caused by timeout.

Until now, overviews of the communication management system 1 and the devices (the tag 10 and the reader 20) included in the communication management system 1) have been described with reference to FIGS. 2A and 2B. Next, the configurations, the processing contents, and the like of the tag 10 and the reader 20 included in the communication management system 1 will be described with reference to FIG. 1 and the like.

(Tag)

Before details of the tag 10 will be described with reference to FIG. 1, for easy understanding of the tag 10, an overview of the tag 10 will be arranged as below.

(Overview of Tag)

The tag 10 is a responder having an anti-collision function of the time slot system and includes: a judging unit 143 that judges whether a predetermined state (for example, an abnormal state) has been detected by the sensor 160; and a time slot determining unit 142 (determination unit) that determines a time slot selected in a case in which the judging unit 143 judges that the sensor 160 has detected the predetermined state to be a more earlier time slot than the time slot selected in a case in which the judging unit 143 judges that the sensor 160 has not detected the predetermined state.

More specifically, only in a case in which the judging unit 143 judges that the predetermined state has been detected by the sensor 160, the time slot determining unit 142 selects an abnormality detection-time time slot earlier (the order is earlier) than a normal detection-time time slot.

According to the configuration described above, the tag 10 determines a time slot selected in a case in which the sensor 160 is judged to have detected the predetermined state to be a time slot earlier than a time slot selected in a case in which the sensor 160 is judged not to have detected the predetermined state. In other words, the tag 10 judged to have detected the predetermined state using the sensor 160 among a plurality of tags 10 responds in a time slot that is earlier than a time slot in which the tag 10 judged not to have detected the predetermined state using the sensor 160 responds.

Accordingly, the tags 10 have an effect of enabling a response from the tag 10 of which the sensor 160 is judged to have detected the predetermined state such as an abnormal state among responses from a plurality of tags 10 to be received with priority by the reader 20 over a response from the tag 10 of which the sensor 160 is judged not to have detected the predetermined state such as an abnormal state.

The time slot determining unit 142 of the tag 10 (1) determines a time slot selected in a case in which the sensor 160 is judged to have detected the predetermined state by the judging unit 143 to be a time slot matching a random number having a value smaller than the random number threshold Rt (predetermined threshold) and (2) determines a time slot selected in a case in which the sensor 160 is judged not to have detected the predetermined state by the judging unit 143 to be a time slot matching a random number having a value that is the random number threshold Rt or more.

For example, (1) in a case in which the predetermined state is judged to have been detected by the sensor 160, the time slot determining unit 142 selects a time slot matching a random number that is generated by a random number generating unit 141 using the Q value included in the query and has a value smaller than the random number threshold Rt. (2) In a case in which the predeteiiiiined state is judged not to have been detected by the sensor 160, the time slot determining unit 142 selects a time slot matching a random number that is generated by the random number generating unit 141 using the Q value included in the query and has a value that is the random number threshold Rt or more.

According to the configuration described above, the tag 10 (1) determines a time slot selected in a case in which the sensor 160 is judged to have detected the predetermined state to be a time slot matching a random number having a value smaller than the random number threshold Rt. In addition, the tag 10 (2) determines a time slot selected in a case in which the sensor 160 is judged not to have detected the predetermined state to be a time slot matching a random number having a value that is the random number threshold Rt or more.

In other words, the tag 10 determines a time slot selected in a case in which the sensor 160 is judged to have detected the predetermined state to be a time slot that is earlier than a time slot selected in a case in which the sensor 160 is judged not to have detected the predetermined state. For this reason, the tag 10 judging that the sensor 160 has detected the predetermined state among a plurality of tags 10 responds in a time slot that is earlier than that for the tag 10 judging that the sensor 160 has not detected the predetermined state.

Accordingly, the tags 10 have an effect of enabling the reader 20 to receive a response from the tag 10 of which the sensor 160 is judged to have detected the predetermined state such as an abnormal state among responses from the plurality of tags 10 with priority over a response from the tag 10 of which the sensor 160 is judged not to have detected the predetermined state such as an abnormal state.

The tag 10 includes the sensor 160. According to the configuration described above, the tag 10 includes the sensor 160, in other words, the tag 10 is a sensor-attached responder. Accordingly, the tags 10 have an effect of enabling the reader 20 to receive a response from the tag 10 judging that the sensor 160 included in its own device has detected the predetermined state such as an abnormal state with priority over a response from the tag 10 judging that the sensor 160 included in its own device has not detected the predetermined state such as an abnormal state.

In addition, it is not essential for the tag 10 to include the sensor 160, and the tag 10 may acquire a detection result acquired by a sensor 160 from the sensor 160 that is present outside its own device. In such a case, the tag 10 judges whether or not the sensor 160 has detected the predetermined state from the acquired detection result and determines a time slot in which its own device responds to the reader 20 on the basis of a result of the determination.

(Details of Tag)

FIG. 1 is a block diagram illustrating the main configuration of the tag 10. The tag 10 illustrated in FIG. I has a configuration including a tag radio communication IC 100, a tag antenna unit 150, and a sensor 160. In order to secure the simplicity of description, a configuration not directly relating to this embodiment is omitted from the description and the block diagram. However, the tag 10 may include the omitted configuration depending on the situation of execution.

The tag antenna unit 150 receives an electric wave from the reader 20 as a power source operating the tag radio communication IC 100 and the like. In addition, the tag antenna unit 150 converts the electric wave received from the reader 20 into a radio signal and transmits the converted radio signal to the tag radio communication IC 100 and converts a radio signal from the tag radio communication IC 100 into an electric wave and transmits the converted electric wave to the reader 20. In other words, when responding to a query from the reader 20, the tag antenna unit 150 transmits identification information of its own device to the reader 20. When responding to the reader 20, the tag antenna unit 150 may transmit a result of detection (for example, one of the occurrence of a predetermined state such as an abnormal state and a physical quantity detected by the sensor 160) acquired by the sensor 160 to the reader 20 in addition to the identification information of its own device. In other words, the tag antenna unit 150 may respond to a query from the reader 20 using the identification information of its own device and respond using a result of the detection acquired by the sensor 160. In the tag antenna unit 150, for example, an antenna, a resonant circuit, and the like are used.

As described above, the tag 10 is a passive-type RFID tag that does not include a power source such as a battery, has a circuit operating using power transmitted in an electric wave from the reader 20, and performs radio communication with the reader 20. However, it is not essential for the tag 10 to be a passive-type RFID tag, and the tag 10 may be an RFID tag of a semi-passive type or an active type including a power source such as a battery.

The sensor 160 is a detector that detects various physical quantities, for example, a position, a speed, pressure, a temperature, a light amount, a vibration, and power (one of a current value and a voltage value) and notifies the tag radio communication IC 100 (particularly, the judging unit 143) of a result of the detection (sensing data). The sensor 160 may notify a detected physical quantity as a result of the detection or notify whether or not the detected physical quantity is larger than a predetermined value (reference value). For example, in a case in which the sensor 160 is a temperature sensor, the sensor 160 may notify a detected temperature or notify whether or not a temperature higher than a predetermined value (reference value) has been detected (for example, whether or not an abnormal high temperature has been detected). On the other hand, in a case in which the sensor 160 is a vibration sensor, the sensor 160 may notify the magnitude of a detected vibration or notify whether or not a vibration larger than a predetermined value (reference value) has been detected (for example, whether or not an abnormal vibration has been detected). In addition, the sensor 160 may be a current sensor or a voltage sensor. In such a case, the sensor 160, for example, may notify a power decrease (power abnormality) in a case in which at least one of a current value and a voltage value of power supplied to the sensor 160 is smaller than a predetermined value (reference value).

The tag radio communication IC 100 stores data from the reader 20 on the basis of a signal received from the reader 20 through the tag antenna unit 150 or transmits stored data and the like to the reader 20 through the tag antenna unit 150. More specifically, the tag radio communication IC 100 receives a query from the reader 20 through the tag antenna unit 150 and responds to the reader 20 through the tag antenna unit 150 using the identification information of its own device and a detection result acquired by the sensor 160. As illustrated in FIG. 1, the tag radio communication IC 100 has a configuration including a tag radio processing unit 110, a power source unit 120, a memory unit 130, and a tag control unit 140. Since the tag radio communication IC 100 has an electric wave transmitted from the reader 20 as its power source, a nonvolatile memory such as a ROM or a memory such as an SRAM or an FeRAM having low power consumption may be used.

The tag radio processing unit 110 converts a radio signal received from the reader 20 through the antenna unit 150 into an original format and outputs converted data to the tag control unit 140. In addition, the tag radio processing unit 110 converts data received from the tag control unit 140 into a format appropriate for radio transmission and transmits a converted radio signal to the reader 20 through the tag antenna unit 150. The tag radio processing unit 110 responds to a query from the reader 20 in a time slot determined by the time slot determining unit 142 using the identification information of its own device and a result of the detection acquired by the sensor 160. In the tag radio processing unit 110, for example, an analog-to-digital (A/D) conversion circuit, a digital-to-analog (D/A) conversion circuit, a modulation/demodulation circuit, an RF circuit, and the like are used.

The power source unit 120 rectifies an induced voltage generated as the tag antenna unit 150 receives an electric wave using a rectification circuit, adjusts the rectified voltage to a predetermined voltage using a power source circuit, and then supplies a resultant voltage to each unit of the tag radio communication IC 100 and the sensor 160. In the power source unit 120, for example, a bridge diode, a voltage adjustment capacitor, and the like are used. Here, it is not essential for the sensor 160 to receive supply of power from the power source unit 120. The tag 10 includes a power source such as a battery dedicatedly used for the sensor 160, and the sensor 160 may receive supply of power from the dedicated power source.

The tag control unit 140 integrally controls the operation performed inside the tag radio communication IC 100. The tag control unit 140, for example, includes a logic operation circuit, a register, and the like, functions as a computer, and controls various operations by executing various control programs. The tag control unit 140, for example, reads and executes a control program installed in a read only memory (ROM) of the memory unit 130 or the like. The tag control unit 140 may download a control program from the reader 20 through the tag antenna unit 150 and the tag radio processing unit 110, install the control program in the memory unit 130, and execute the control program. In the tag control unit 140 illustrated in the drawing, a random number generating unit 141, a time slot determining unit 142, and a judging unit 143 are included as functional blocks.

The random number generating unit 141 generates a random number (pseudorandom number) using a Q value included in a query received from the reader 20. More specifically, the random number generating unit 141 generates a random number in the range of "0" to "$2^Q-1$". For example, in a case in which the Q value=3, $2^3$=8=[1000], and thus, the random number generating unit 141 generates one of [000] to [111] of three bits. Similarly, for example, in a case in which the Q value=4, $2^4$=16=[10000], and thus, the conventional tag 80 generates one of [0000] to [1111] of four bits.

The time slot determining unit 142 determines a time slot in which the tag radio processing unit 110 transmits an ID and the like (in other words, responds) using the random number threshold Rt stored in the memory unit 130 from a random number generated by the random number generating unit 141 and a result of the deteimination notified from the judging unit 143. The time slot determining unit 142 notifies the tag radio processing unit 110 of the determined time slot. A method of determining a time slot using the time slot determining unit 142 will be described in detail with reference to FIG. 4.

The judging unit 143 judges whether or not the sensor 160 has detected a predetermined state such as an abnormal state and notifies the time slot determining unit 142 of a result of the determination. The judging unit 143 acquires the result of the detection (for example, one of the occurrence of a predetermined state such as an abnormal state and a physical quantity detected by the sensor 160) acquired by the sensor 160 from the sensor 160.

In a case in which the physical quantity detected by the sensor 160 is acquired from the sensor 160, the judging unit 143, for example, judges whether the acquired physical quantity is larger than a predetermined value (reference value) and judges that the predetermined state (for example, an abnormal state) has occurred in a case in which the physical quantity is larger than the predetermined value (reference value). More specifically, in a case in which a temperature detected by the sensor 160 is higher than a predetermined value (reference value), the judging unit 143 judges that a predetermined state (for example, an abnormal high temperature state) has occurred. In addition, in a case in which the magnitude of a vibration detected by the sensor 160 is larger than a predetermined value (reference value), the judging unit 143 judges that a predetermined state (for example, an abnormal vibration state) has occurred. Furthermore, in a case in which at least one of a current value and a voltage value of power detected by the sensor 160 is smaller than a predetermined value (reference value), the judging unit 143 judges that a predetermined state (for example, an abnormal power state) has occurred.

The judging unit 143 may acquire a detection result representing whether or not a predetermined state such as an abnormal state has occurred from the sensor 160 and judge whether or not the predetermined state such as an abnormal state has occurred on the basis of such a detection result.

The judging unit 143 judges occurrence/no-occurrence of a predetermined state such as an abnormal state (in other words, whether or not the sensor 160 has detected an abnormal state such as an abnormal state) and notifies the time slot determining unit 142 of a result of the determination.

The physical quantities detected by the sensor 160, the method of the determination performed by the judging unit 143 using a physical quantity detected by the sensor 160 and a predetermined value (reference value), and the content of the determination performed by the judging unit 143 described until now are merely examples. The judging unit 143 may judge the occurrence/no-occurrence of a predetermined state such as an abnormal state, for example, by using the magnitude relation between a physical amount detected by the sensor 160 and a predetermined value (reference value) or the like, that is, on the basis of the physical quantities detected by the sensor 160 and notify the time slot determining unit 142 of a result of the determination.

In addition to the performance of the processes described above using the random number generating unit 141, the time slot determining unit 142, and the judging unit 143, the tag control unit 140 further perforans the following process. In other words, the tag control unit 140 stores data received from the reader 20 through the tag antenna unit 150 and the tag radio processing unit 110 in the memory unit 130. In addition, the tag control unit 140 reads data (for example, identification information of its own device) stored in the memory unit 130 and transmits the read data to the reader 20 through the tag antenna unit 150 and the tag radio processing unit 110. Furthermore, the tag control unit 140 transmits a detection result (for example, at least one of the occurrence of a predetermined state such as an abnormal state and a physical quantity detected by the sensor 160) acquired from the sensor 160 to the reader 20 through the tag antenna unit 150 and the tag radio processing unit 110.

The memory unit 130 is configured by a semiconductor memory such as a ROM, a static RAM (SRAM), or a ferroelectrics memory (FeRAM) described above. Examples of contents stored in the memory unit 130 include the control program descried above, other various programs, and various kinds of data. In addition, the identification information of its own device and the random number threshold Rt are stored in the memory unit 130.

The random number threshold Rt is used when a time slot in which a response to a query from the reader 20 is performed is determined (selected) by the time slot determining unit 142. More specifically, (1) in a case in which a predetermined state such as an abnormal state is judged to have occurred by the judging unit 143, the time slot determining unit 142 selects a time slot matching a random number (pseudorandom number) that is generated by the random number generating unit 141 and has a value smaller than the random number threshold Rt. On the other hand, (2) in a case in which the predetermined state such as an abnormal state is.judged to have occurred by the judging unit 143, the time slot determining unit 142 selects a time slot matching a random number (pseudorandom number) that is generated by the random number generating unit 141 and has a value that is the random number threshold Rt or more.

(Reader)

Until now while the configuration of the tag 10 has been described with reference to FIG. 1, next, the reader 20 communicating with a plurality of tags 10 will be described in detail with reference to FIG. 3. First, for easy understanding of the reader 20, an overview of the reader 20 will be arranged as below.

(Overview of Reader)

The reader 20 is an interrogator communicating with each of a plurality of responders having an anti-collision function of the time slot system like that of the plurality of tags 10. The reader 20 includes: a reception judging unit 201 that judges whether a response received in a time slot that has a time slot determination value Ts (predetermined value) or less in the order is present among responses from a plurality of tags 10; and a Q value designating unit 202 (designation unit) that designates the number of time slots that can be selected by each of the plurality of tags 10 to be $2^{Q2}$ (predetermined reference value) or less in a case in which the reception judging unit 201 judges that a response received in a time slot that has the time slot determination value Ts or less the an order is present.

According to the configuration described above, in a case in which it is judged that a response received in a time slot having the time slot determination value Ts or less in the order is present among the responses from the plurality of tags 10, the reader 20 designates the number of time slots that can be selected by each of the plurality of tags 10 to be a number that is $2^{Q2}$ or less. In other words, in a case in which it is judged that a response received in a time slot that has the time slot determination value Ts or less in the order is present, the reader 20 limits tags 10 that can respond to the reader 20.

For example, in a case in which only the tag 10 that has detected a predetermined state using the sensor 160 can respond in a time slot that has the time slot determination value Ts or less in the order, the reader 20, for example, limits the tag 10 that can respond to the reader 20 to the tag 10 that has detected the predetermined state using the sensor 160.

Accordingly, there is an effect that the reader 20 can receive a response from the tag 10 that has detected a predetermined state using the sensor 160 with priority over a response from the tag 10 that has not detected the predetermined state using the sensor 160.

(Details of Reader)

Figure 3:
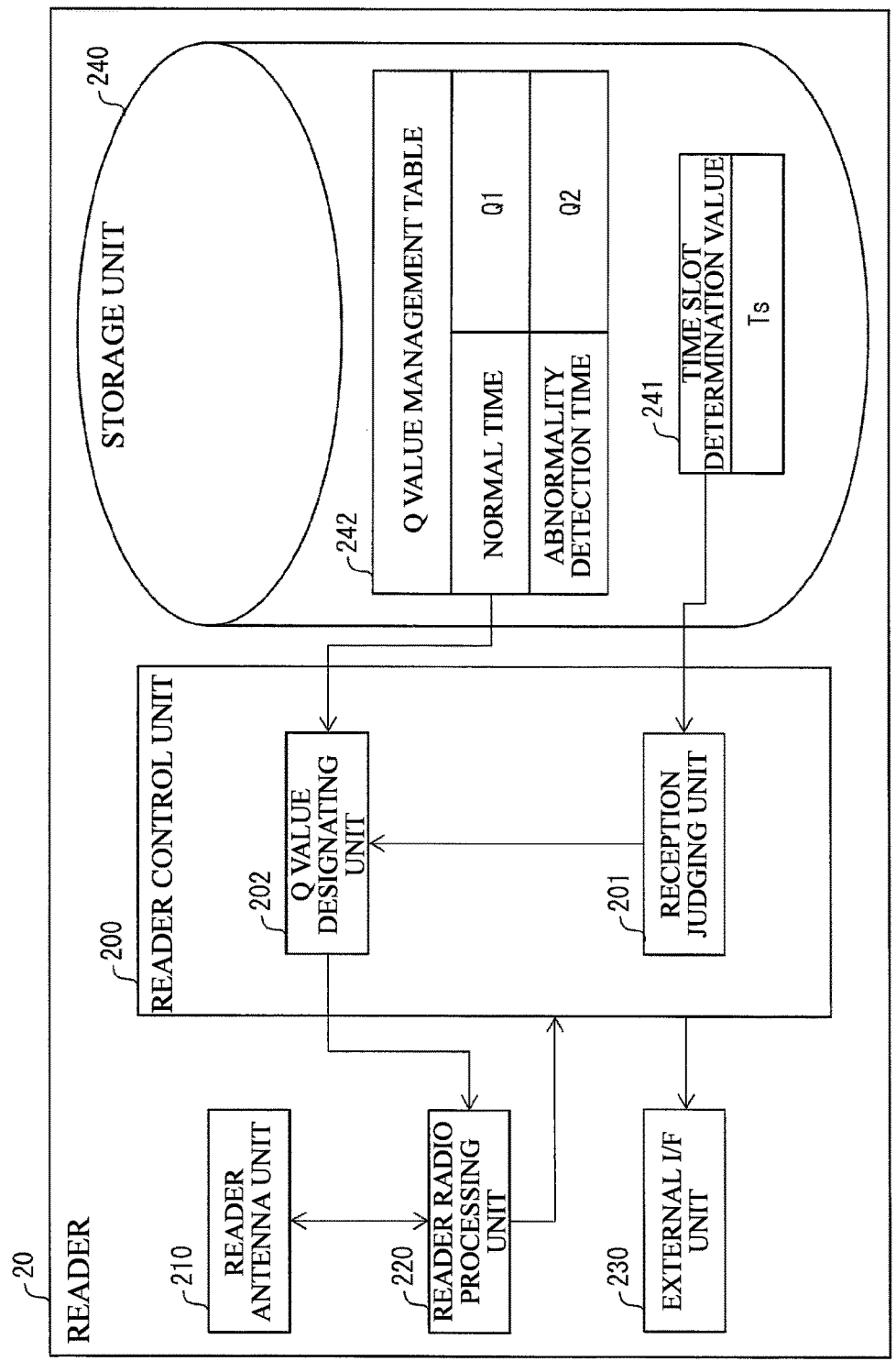
FIG. 3 is a block diagram illustrating the main configuration of an RFID reader/writer according to Embodiment 1 of the invention.

FIG. 3 is a block diagram illustrating the main configuration of the reader 20. The reader 20 illustrated in FIG. 3 has a configuration including a reader control unit 200, a reader antenna unit 210, a reader radio processing unit 220, and an external I/F unit 230. In order to secure the simplicity of description, a configuration not directly relating to this embodiment is omitted from the description and the block diagram. However, the reader 20 may include the omitted configuration depending on the situation of execution.

The reader 20 uses an anti-collision function of the time slot system for the control of communication with a plurality of tags 10. By using this function, even when a plurality of tags 10 are present inside a communication area of the reader antenna unit 210 of the reader 20, the reader 20 can read data transmitted from each of the plurality of tags 10 approximately together.

The reader antenna unit 210 transmits a radio signal from the reader radio processing unit 220 to the outside as an electric wave, converts an electric wave received from the outside into a radio signal, and outputs the converted radio signal to the reader radio processing unit 220. In the reader antenna unit 210, for example, an antenna, a resonant circuit, and the like are used.

The reader radio processing unit 220 converts data acquired from the reader control unit 200 into a format appropriate for radio transmission and transmits a converted radio signal to the tag 10 through the reader antenna unit 210. In addition, the reader radio processing unit 220 converts a radio signal received from the tag 10 through the reader antenna unit 210 into the original format and outputs converted data to the reader control unit 200. The reader radio processing unit 220 issues a query including a Q value designated (set) by the Q value designating unit 202 through the reader antenna unit 210. In addition, the reader radio processing unit 220 receives a response from each of a plurality of tags 10 through the reader antenna unit 210 and notifies the received response to the reader control unit 200 (particularly, the reception judging unit 201) together with information representing a time slot in which the response is present. In the reader radio processing unit 220, for example, an analog-to-digital (A/D) conversion circuit, a digital-to-analog (D/A) conversion circuit, a modulation/demodulation circuit, an RF circuit, and the like are used.

The external I/F unit 230 communicates with an external device such as a programmable logic controller (PLC). Examples of the interface specification of the external I/F unit 230 include Universal Serial Bus (USB), IEEE1394, and Ethernet (registered trademark).

The reader control unit 200 integrally controls the function of the reader 20. In the reader control unit 200, a reception judging unit 201 and a Q value designating unit 202 are included as functional blocks.

The reception judging unit 201 judges whether or not a response received in a predetermined range of time slots is present among responses from the plurality of tags 10 and notifies the Q value designating unit 202 of a result of the determination. More specifically, the reception judging unit 201 (1) acquires a response from each of the plurality of tags 10 and information representing a time slot in which the response is present from the reader radio processing unit 220. The reception judging unit 201 (2) acquires a time slot deteimination value Ts by referring to a time slot determination value table 241 of a storage unit 240. The reception judging unit 201 (3) judges whether a response received in a time slot that has the time slot determination value Ts or less in the order (in other words, the same as the time slot determination value Ts or earlier than the time slot determination value Ts) is present among the responses from the plurality of tags 10. In other words, the reception judging unit 201 judges whether a time slot that has the time slot determination value Ts or less in the order is present among a plurality of time slots in which the plurality of tags 10 respond. The reception judging unit 201 (4) notifies a result of the determination to the Q value designating unit 202.

In a case in which it is judged that a response in a time slot that has the time slot determination value Ts or less in the order is present, the reception judging unit 201 may additionally notify an external device such as a PLC of the occurrence of a predetermined state through the external I/F unit 230.

The Q value designating unit 202 designates a Q value to be included in a query by referring to a Q value management table 242 stored in the storage unit 240 from the result of the determination notified from the reception judging unit 201 and notifies the reader radio processing unit 220 of the designated Q value. In a case in which the reception judging unit 201 judges that a response in a time slot that has the time slot determination value Ts or less in the order is present, the Q value designating unit 202 sets the value of the Q value to be smaller than that of a case in which it is judged that such a response is not present. In other words, the Q value designating unit 202 designates the Q value as Q1 or Q2 (Q1>Q2≥0) stored in the Q value management table 242 on the basis of the result of the determination notified from the reception judging unit 201.

More specifically, (A) in a case in which the reception judging unit 201 judges that a response received in a time slot that has the time slot determination value Ts or less in the order is not present, the Q value designating unit 202 selects the normal mode and sets the Q value as Q1 (Q1>Q2≥0) that is a normal-time Q value. On the other hand, (B) in a case in which the reception judging unit 201 judges that a response received in a time slot that has the time slot determination value Ts or less in the order is present, the Q value designating unit 202 selects the abnormality detection mode and sets the Q value as Q2 that is an abnormality detection-time Q value.

In addition, the Q value designating unit 202 may set the Q value to an abnormality detection-time Q value in a case in which a response received in a time slot that has the time slot determination value Ts or less in the order is present and set the Q value to a value larger than the abnormality detection-time Q value in a case in which such a response is not present. In other words, the Q value designating unit 202 may set a Q value of a case in which a response received in a time slot that has the time slot determination value Ts or less in the order is present (in other words, in a case in which a predetermined state has occurred) to be smaller than a Q value of a case in which the predetermined state does not occur.

Each functional block of the reader control unit 200 described above can be realized, for example, by a central processing unit (CPU) or the like reading a program stored in a storage device (the storage unit 240) implemented using a read only memory (ROM), a non-volatile random access memory (NVRAM), or the like into a random access memory (RAM) or the like not illustrated in the drawing and executing the program.

The storage unit 240 stores various kinds of data used by the reader 20. The storage unit 240 stores (1) a control program, (2) an OS program, and (3) application programs used for executing various functions that are executed by the reader 20, and (4) various kinds of data read in a case in which the application programs are executed. The data of (1) to (4) described above, for example, is stored in a non-volatile storage device, for example, a read only memory (ROM), a flash memory, an erasable programmable ROM (EPROM), an electrically EPROM (EEPROM (registered trademark)), a hard disc drive (HDD), and the like. In addition, the time slot determination value table 241 and the Q value management table 242 are stored in the storage unit 240.

In the time slot determination value table 241, the time slot determination value Ts used when the reception judging unit 201 judges the occurrence/no-occurrence of a predetermined state from a time slot in which each of the plurality of tags 10 responds is stored.

In the Q value management table 242, Q1 that is the normal-time Q value and Q2 that is the abnormality detection-time Q value are stored (Q1>Q2≥0). Q1 is a Q value designated by the Q value designating unit 202 in a case in which the reception judging unit 201 judges that a response received in a time slot that has the time slot determination value Ts or less in the order is not present among responses from the plurality of tags 10. Q2 is a Q value designated by the Q value designating unit 202 in a case in which the reception judging unit 201 judges that a response received in a time slot that has the time slot determination value Ts or less in the order is present among responses from the plurality of tags 10.

(Method of Selecting Time Slot of Tag According to One or Some Exemplary Embodiments of the Invention)

Figure 4:
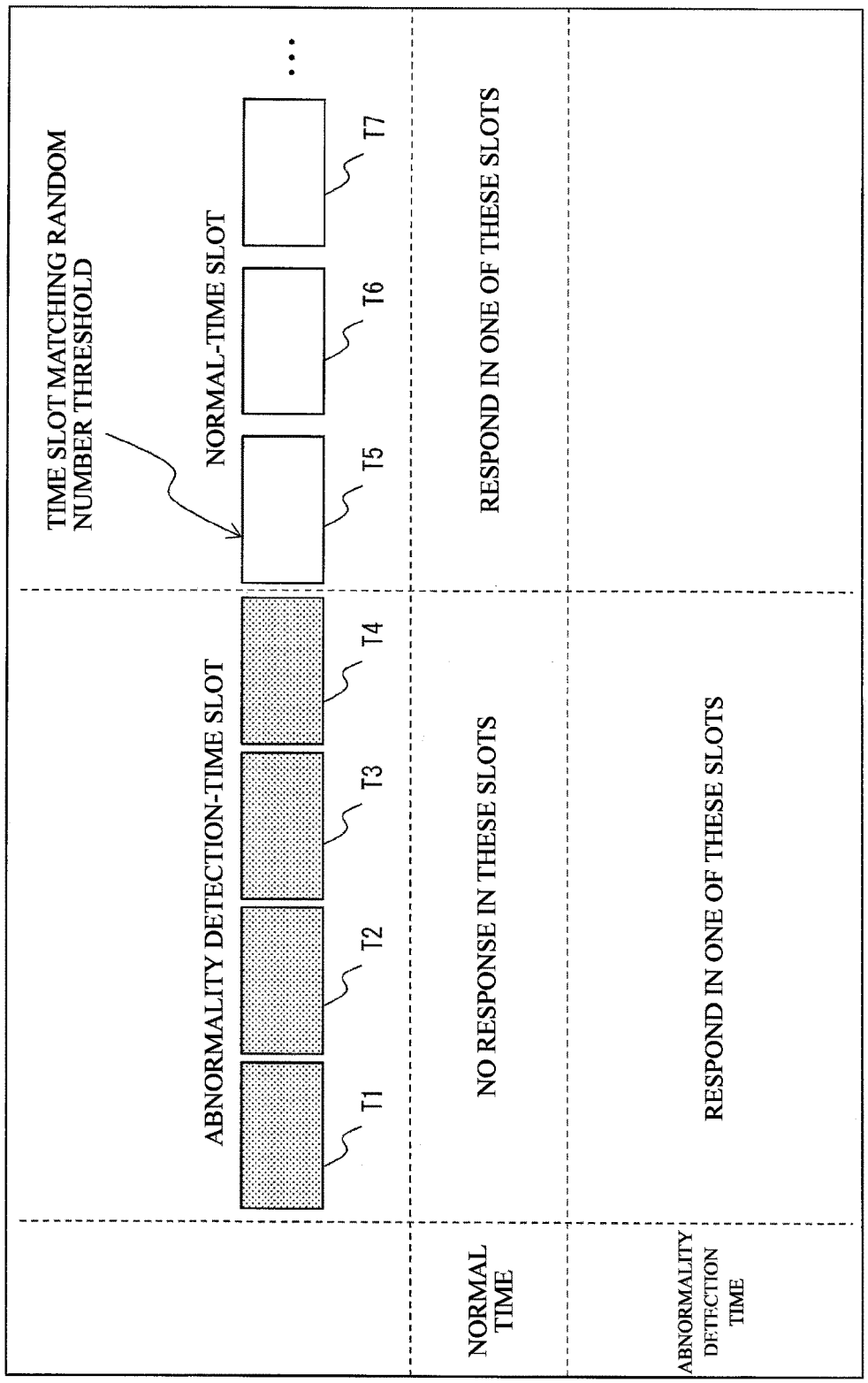
FIG. 4 is a diagram describing time slots selected by the RFID tag illustrated in FIG. 1.

FIG. 4 is a diagram describing time slots selected by the tag 10. The time slot determining unit 142 determines a time slot in which a query from the reader 20 is responded to be an abnormality detection-time time slot or a normal-time time slot. Only in a case in which the judging unit 143 judges that the predetermined state such as an abnormal state has been detected by the sensor 160, the time slot determining unit 142 determines a time slot in which a query is responded to be an abnormality detection-time time slot".

The abnormality detection-time time slot is a random number (pseudorandom number) generated by the random number generating unit 141 using a Q value included in a query and is a time slot matching a random number having a value smaller than the random number threshold Rt. In FIG. 4, abnormality detection-time time slots and normal-time time slots of a case in which the random number threshold Rt=4=[100] are illustrated as an example.

In a case in which the random number threshold Rt=4= [100], the abnormality detection-time time slot is one of time slots T1 to T4 matching [00] to [11]. In addition, the normal-time time slots are time slots including a time slot T5 and later time slots matching random numbers having values of [100] or more.

Only in a case in which the sensor 160 is judged to have detected the predetermined state such as an abnormal state by the judging unit 143, the time slot determining unit 142 determines a time slot in which the query is responded to be one of the time slots T1 to T4. In a case in which sensor 160 is judged not to have detected the predetermined state such as an abnormal state by the judging unit 143, the time slot deteimining unit 142 determines a time slot in which the query is responded to be one of time slots including the time slot T5 and later time slots.

(Flow of Process Performed in system)

For the tag 10 and the reader 20 of which the configurations and the like have been described with reference to FIGS. 1 to 4 until now, next, the process performed by each of the tag 10 and the reader 20 will be described with reference to FIGS. 5 and 6.

(Flow of Process Performed by Tag)

Figure 5:
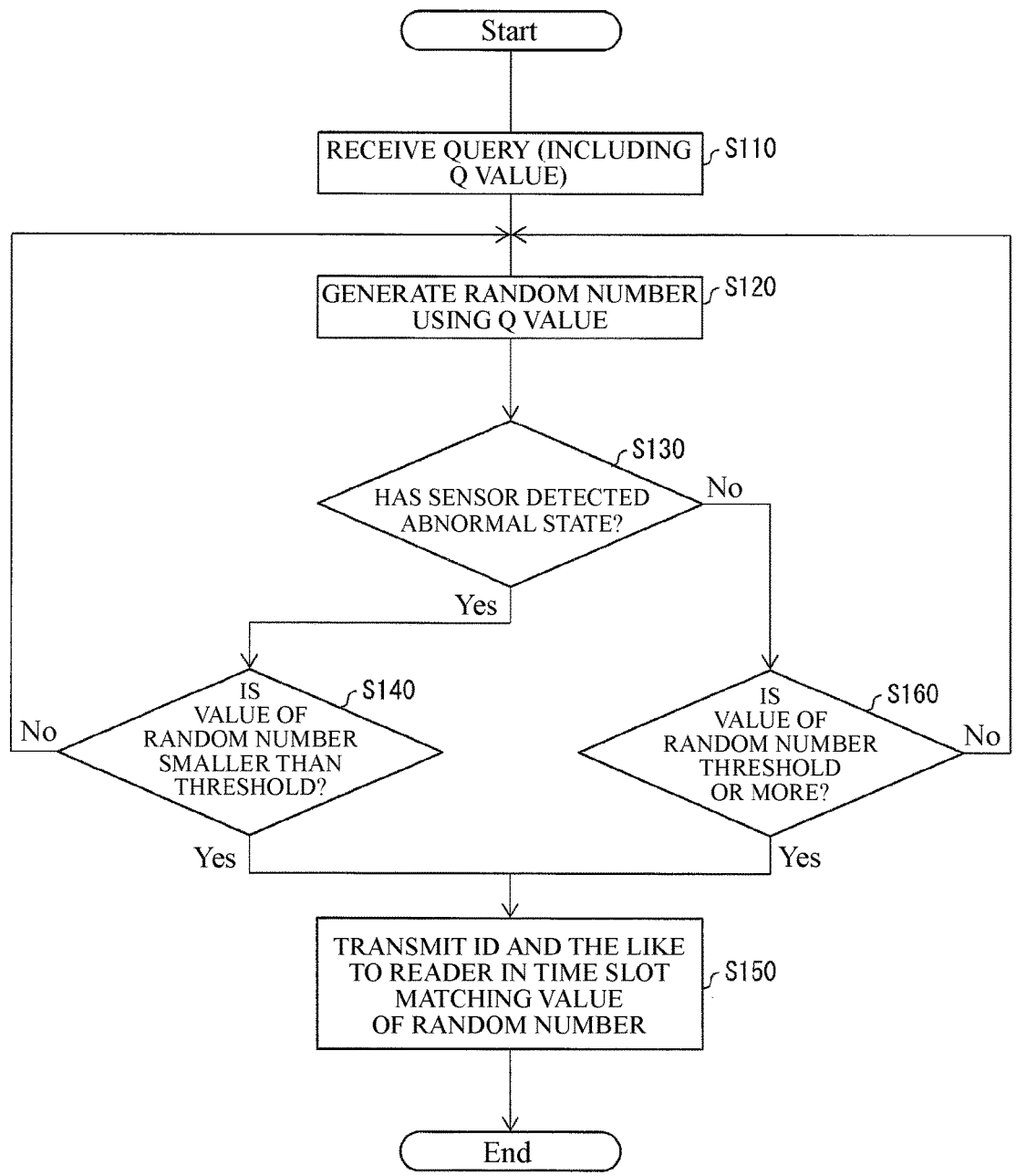
FIG. 5 is a flowchart illustrating an overview of a process performed by the RFID tag illustrated in FIG. 1.

FIG. 5 is a flowchart illustrating an overview of the process performed by the tag 10. As illustrated in FIG. 5 as an example, when the tag antenna unit 150 receives a query (including a Q value) from the reader 20 (S110), the random number generating unit 141 generates a random number (pseudo random number) by using the Q value (S120).

The judging unit 143 acquires a detection result acquired by the sensor 160 from the sensor 160 and judges whether or not the sensor 160 has detected a predetermined state such as an abnormal state (S130). In a case in which the sensor 160 is judged to have detected a predetermined state such as an abnormal state by the judging unit 143 (Yes in S130), the time slot determining unit 142 judges whether or not the random number generated by the random number generating unit 141 is smaller than the random number threshold Rt (S140).

In a case in which the random number (the value of the random number) generated by the random number generating unit 141 is judged to be smaller than the random number threshold Rt (Yes in S140), the time slot deteiiiiining unit 142 notifies the tag radio processing unit 110 of a time slot matching the random number (matching the value of the random number). The tag radio processing unit 110 responds to the query from the reader 20 in the time slot notified from the time slot determining unit 142 using the identification information of its own device and the result of the detection acquired by the sensor 160 (S150).

On the other hand, in a case in which the random number generated by the random number generating unit 141 is judged to be the random number threshold Rt or more (No in S140), the time slot determining unit 142 directs the random number generating unit 141 to regenerate a random number, and the random number generating unit 141 that has received the direction of the regeneration generates a random number using the Q value (S120). The processes of S120 to S140 are repeated until the random number generated by the random number generating unit 141 becomes smaller than the random number threshold Rt.

In other words, in a case in which the judging unit 143 judges that the predetermined state has been detected by the sensor 160 (Yes in S130), the time slot determining unit 142 selects an abnoiiiiality detection-time time slot that is a time slot matching a random number smaller than the random number threshold Rt.

On the other hand, in a case in which the judging unit 143 judges that the predetermined state such as an abnormal state has not been detected by the sensor 160 (No in S130), the time slot determining unit 142 judges whether the random number generated by the random number generating unit 141 is the random number threshold Rt or more (S160).

In a case in which the random number (the value of the random number) generated by the random number generating unit 141 is judged to be the random number threshold Rt or more (Yes in S160), the time slot determining unit 142 notifies the tag radio processing unit 110 of a time slot matching the random number (matching the value of the random number). The tag radio processing unit 110 responds to the query from the reader 20 in a time slot notified from the time slot determining unit 142 using the identification information of its own device and the result of the detection acquired by the sensor 160 (S150).

On the other hand, in a case in which the random number generated by the random number generating unit 141 is judged to be smaller than the random number threshold Rt (No in S160), the time slot determining unit 142 directs the random number generating unit 141 to regenerate a random number, and the random number generating unit 141 that has received the direction of regeneration generates a random number using the Q value (S120). The processes of S120, S130, and S160 are repeated until the random number generated by the random number generating unit 141 becomes smaller than the random number threshold Rt.

In other words, in a case in which the judging unit 143 judges that the predetermined state has not been detected by the sensor 160 (No in S130), the time slot determining unit 142 selects a normal-time time slot that is a time slot matching a random number that is the random number threshold R or more.

(Specific Example of Method of Determining Time Slot)

In a case in which the Q value=8, and the random number threshold Rt=4, the time slot determining unit 142 and the random number generating unit 141 perform the following process. First, since 28=[100000000], time slots that can be selected by the tag 10 are time slots respectively matching random numbers [00000000] to [11111111] of eight bits. The random number generating unit 141 generates one of [00000000] to [11111111] (S120).

Second, the time slot determining unit 142 determines a random number as below in accordance with the random number generated by the random number generating unit 141 and a result of the determination acquired by the judging unit 143 and notifies the tag radio processing unit 110 of a time slot matching the determined random number.

The time slot determining unit 142 to which the determination result of detection of a predetermined state using the sensor 160 (Yes in S130) is notified from the judging unit 143 judges whether the random number generated by the random number generating unit 141 is smaller than the random number threshold Rt (S140). In a case in which the random number generated by the random number generating unit 141 is judged to be smaller than the threshold Rt (Yes in S140), the time slot determining unit 142 notifies the tag radio processing unit 110 of a time slot matching the random number. On the other hand, in a case in which the random number generated by the random number generating unit 141 is judged to be the threshold Rt or more (No in S140), the time slot determining unit 142 directs the random number generating unit 141 to regenerate a random number. The time slot determining unit 142 causes the random number generating unit 141 to generate a random number until the random number generated by the random number generating unit 141 becomes smaller than the random number threshold Rt.

Since the random number threshold Rt=4=[00000100], in a case in which the random number generated by the random number generating unit 141 is one of [00000000] to [00000011], the time slot determining unit 142 notifies the tag radio processing unit 110 of a time slot matching the random number. In a case in which the random number generated by the random number generating unit 141 is one of [00000100] to [11111111], the time slot determining unit 142 causes a random number to be regenerated until the random number generated by the random number generating unit 141 is one of [00000000] to [00000011].

On the other hand, the time slot determining unit 142 to which the determination result of no detection of the predetermined state using the sensor 160 (No in S130) is notified from the judging unit 143 judges whether the random number generated by the random number generating unit 141 is the random number threshold Rt or more (S160). In a case in which the random number generated by the random number generating unit 141 is judged to be the random number threshold Rt or more (Yes in S160), the time slot determining unit 142 notifies the tag radio processing unit 110 of a time slot matching the random number. On the other hand, in a case in which the random number generated by the random number generating unit 141 is judged to be smaller than the random number threshold Rt (No in S160), the time slot determining unit 142 directs the random number generating unit 141 to regenerate a random number. The time slot determining unit 142 causes the random number generating unit 141 to regenerate a random number until the random number generated by the random number generating unit 141 becomes the random number threshold Rt or more.

In a case in which the random number generated by the random number generating unit 141 is one of [00000100] to [11111111], the time slot determining unit 142 notifies the tag radio processing unit 110 of a time slot matching the random number. In a case in which the random number generated by the random number generating unit 141 is one of [00000000] to [00000011], the time slot determining unit 142 causes a random number to be regenerated until the random number generated by the random number generating unit 141 becomes one of [00000100] to [11111111].

(Modified Example of Method of Determining Time Slot)

The method in which the time slot determining unit 142 (A) selects an abnormality detection-time time slot in a case in which the sensor 160 has detected a predetermined state and (B) selects a normal-time time slot in a case in which the predetermined state has not been detected is not limited to the method illustrated in FIG. 5.

For example, (A) in a case in which the judging unit 143 judges that the predetermined state has been detected using the sensor 160, the random number generating unit 141 may generate a random number using Qx. Here, Qx is a value causing a random number generated by the random number generating unit 141 using Qx to be smaller than the random number threshold Rt, in other words, "Rt≥$2^{Qx}$" is satisfied.

For example, in a case in which the random number threshold Rt=4=$2^2$, "2≥Qx". Accordingly, in a case in which the judging unit 143 judges that the predetermined state has been detected using the sensor 160, the random number generating unit 141, for example, generates a random number using "Qx=2" satisfying "2≥Qx". More specifically, since $2^2$=[100], the random number generating unit 141 generates one of random numbers [00] to [11] of two bits, in other words, any random number generated by the random number generating unit 141 using Qx is smaller than "the random number threshold Rt=4". Then, the time slot determining unit 142 selects a time slot matching the random number generated by the random number generating unit 141 using Qx as a time slot used for responding to the reader 20.

In addition, (B) in a case in which the judging unit 143 judges that the predetermined state has been detected using the sensor 160, the random number generating unit 141 generates a random number using a Q value included in the query received from the reader 20. Then, the time slot determining unit 142 selects a time slot matching the random number generated by the random number generating unit 141 using the Q value and has a value that is the random number threshold Rt or more as a time slot used for responding to the reader 20.

In other words, in accordance with a determination result acquired by the judging unit 143, in other words, in accordance with whether or not the sensor 160 has detected a predetermined state (in other words, the occurrence/no-occurrence of the predetermined state), the random number generating unit 141 may generate a random number using Qx satisfying "Rt≥$2^{Qx}$" or the Q value. More specifically, (A) in a case in which the predetermined state has occurred, the random number generating unit 141 may generate a random number using Qx, and (B) in a case in which the predetermined state has not occurred, the random number generating unit 141 may generate a random number using the Q value.

In the example of the process illustrated in FIG. 5, in a case in which the predetermined state has occurred (Yes in S130), the random number generating unit 141 generates a random number using the Q value until the generated random number becomes smaller than the random number threshold Rt. For this reason, in the example of the process illustrated in FIG. 5, there is a possibility that the random number generating unit 141 generates a random number any number of times, and a response of the tag 10 to the reader 20 is delayed. In contrast to this, by generating a random number using Qx once, the random number generating unit 141 can generate a random number that is smaller than the random number threshold Rt (having a value smaller than the random number threshold Rt). Accordingly, in a case in which a predetermined state has occurred, the random number generating unit 141 generates a random number using Qx, whereby the tag 10 can respond to the reader 20 more quickly than that example of the process illustrated in FIG. 5. Regarding the value of a random number generated by the random number generating unit 141, (A) a random number (the value of the random number) generated in a case in which the predetermined state has occurred is smaller than (B) a random number (the value of the random number) generated in a case in which the predetermined state has not occurred.

As described above, (A) in a case in which the predetermined state has occurred, the time slot determining unit 142 selects a time slot matching a random number having a value smaller than the random number threshold Rt as a time slot used for responding to the reader 20. (B) In a case in which the predetermined state has not occurred, the time slot determining unit 142 selects a time slot matching a random number having a value that is the random number threshold Rt or more as a time slot used for responding to the reader 20.

The process performed by the tag 10 described with reference to FIG. 5 can be summarized as below. The process performed by the tag 10 is a method of controlling a responder having an anti-collision function of the time slot system includes a detennination step (S130) in which it is judged whether or not the sensor 160 has detected a predetermined state (for example, an abnormal state) and a detennination step (S140 and S160) in which a time slot selected in a case in which the sensor 160 is judged to have detected the predetermined state in the determination step is determined to be a time slot earlier than a time slot selected in a case in which the sensor 160 is judged not to have detected the predetermined state in the determination step.

More specifically, only in a case (Yes in S130) there the predetermined state is judged to have been detected by the sensor 160, an abnormality detection-time time slot that is earlier (earlier in the order) than a normal-time time slot is selected (S140).

According to the control method described above, the tag 10 determines a time slot selected in a case in which the sensor 160 is judged to have detected the predetermined state to be a time slot earlier than a time slot selected in a case in which the sensor 160 is judged not to have detected the predetermined state. In other words, among a plurality of tags 10, a tag 10 of which the sensor 160 is judged to have detected the predetermined state responds in an earlier time slot than a tag 10 of which the sensor 160 is judged not to have detected the predetermined state.

Accordingly, the process perfoi ied by the tag 10 has an effect of enabling the reader 20 to receive a response from a tag 10 of which the sensor 160 is judged to have detected the predetermined state such as an abnormal state among the response from the plurality of tags 10 with priority over a response from a tag 10 of which the sensor 160 is judged not to have detected the predetermined state such as an abnormal state.

(Flow of Process Performed by Reader)

Figure 6:
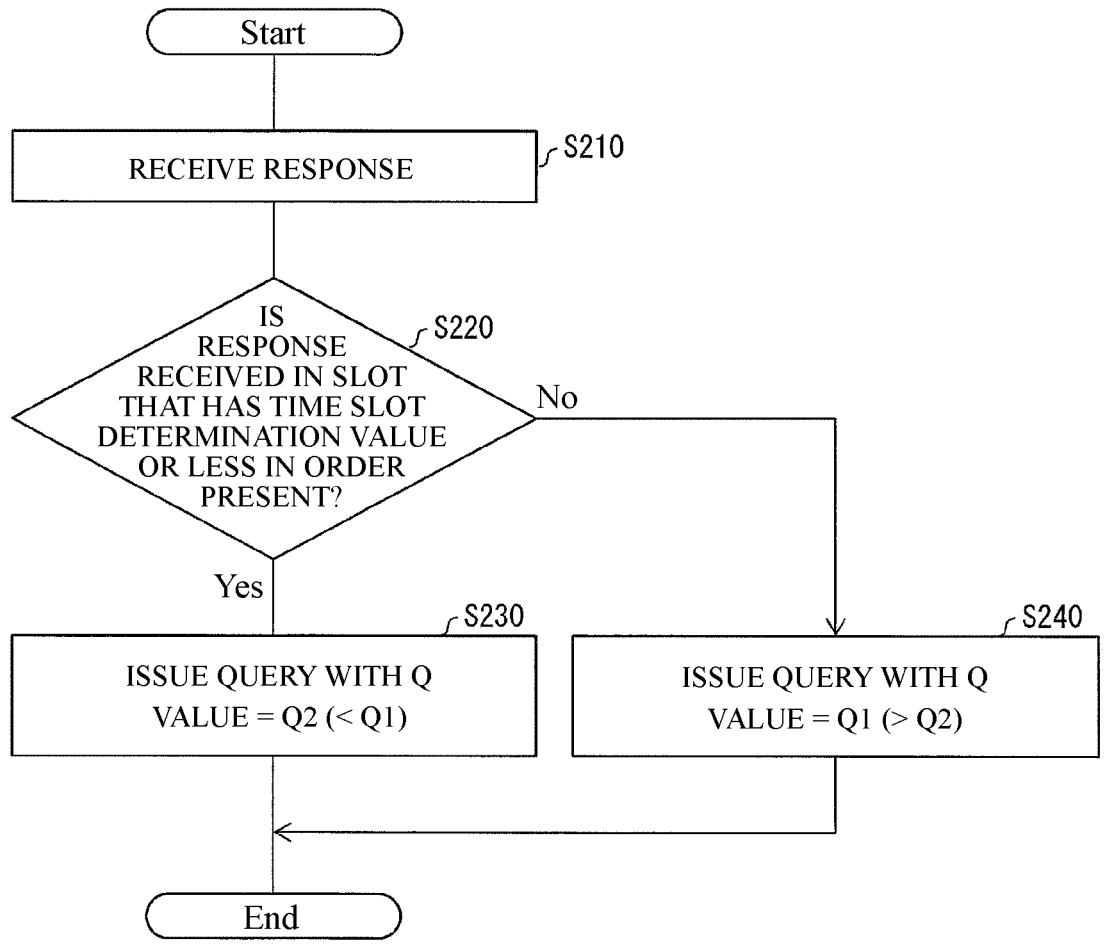
FIG. 6 is a flowchart illustrating an overview of a process performed by the reader/writer illustrated in FIG. 3.

FIG. 6 is a flowchart illustrating an overview of the process performed by the reader 20. As illustrated in FIG. 6 as an example, when the reader antenna unit 210 receives a response from the tag 10 (S210), the reception judging unit 201 judges whether the response is received in a time slot that has the time slot determination value Ts or less in the order (S220). In other words, the reception judging unit 201 judges whether a time slot that is the time slot determination value Ts or less (a time slot that is the same as the time slot determination value Ts or earlier than the time slot determination value Ts) is present among time slots in which a plurality of tags 10 respond.

In a case in which a response received in a time slot that has the time slot determination value Ts or less in the order is judged to be present by the reception judging unit 201 (Yes in S220), the Q value designating unit 202 issues a query with the Q value=Q2 (<Q1) (S230). On the other hand, in a case in which a response received in a time slot that has the time slot determination value Ts or less in the order is judged not to be present by the reception judging unit 201 (No in S220), the Q value designating unit 202 issues a query with the Q value=Q1 (>Q2) (S240).

(Specific Example of Method of Determining Q Value)

In a case in which Q2 satisfies "$2^{Q2}$=the random number threshold Rt", and the time slot determination value Ts is a time slot that is one time slot before a time slot matching the random number threshold Rt, the reader 20 permits only the tag 10 that has detected the predetermined state using the sensor 160 to respond. For example, in a case in which the random number threshold Rt=4=[100], Q2 satisfies $2^{Q2}$=the random number threshold Rt, and accordingly, Q2=2. In addition, since the time slot determination value Ts is a time slot that is one time slot before a time slot T5 matching the random number threshold Rt=[100], the time slot determination value Ts is a time slot T4.

Since the random number threshold Rt=[100], only a tag 10 that has detected a predetermined state such as an abnormal state using the sensor 160 responds to the reader 20 in one of time slots T1 to T4 matching random numbers (in other words, [00] to [11]) having values smaller than [100].

When a response from the tag 10 is received (S210), the reception judging unit 201 judges whether or not a time slot in which the response is received is the time slot determination value Ts or less (S220). More specifically, the reception judging unit 201 judges whether or not the response from the tag 10 is received in a time slot that has the time slot determination value Ts=T4 or less in the order, in other words, one of time slots T1 to T4.

Since the random number threshold Rt=[100], in a case in which the reader 20 receives a response from the tag 10 in one of time slots T1 to T4 matching random numbers having values smaller than [100], the sensor 160 included in the tag 10 that has responded detects the predetermined state. Accordingly, by judging whether or not the response from the tag 10 has been received in a time slot that is the time slot determination value Ts=T4 or less, the reception judging unit 201 can judge whether the predetermined state has been detected (the predetermined state has occurred) using the sensor 160.

In a case in which the response from the tag 10 is judged to have been received in one of the time slots T1 to T4 (Yes in S220), the Q value designating unit 202 issues a query with the Q value=Q2=2 (S230). In other words, in a case in which the predetermined state is judged to have occurred by the reception judging unit 201, the Q value designating unit 202 issues a query with the Q value=Q2=2.

When the tag 10 receives a query including the Q value=Q2=2, $2^2$=[100], and thus, the random number generating unit 141 generates one of random numbers [00] to [11] of two bits. Here, each of [00] to [11] generated by the random number generating unit 141 is smaller than the random number threshold Rt=4=[100]. A tag 10 that can respond to the reader 20 in one of the time slots T1 to T4 matching random numbers [00] to [11] having values smaller than the random number threshold Rt=4=[100] is only the tag 10 that has detected the predetermined state such as an abnormal state using the sensor 160.

In other words, in a case in which the random number threshold Rt=4=[100], Q2=2, and the time slot determination value Ts=T4, when the predetermined state is judged to have occurred by the reception judging unit 201, the reader 20 limits the tag 10 that can respond to the reader 20 as below. The reader 20 limits a tag 10 that can respond to the reader 20 only to the tag 10 that has detected the predetermined state such as an abnormal state using the sensor 160.

Accordingly, by (A) setting Q2 to satisfy "$2^{Q2}$=random number threshold Rt" and (B) setting the time slot determination value Ts to a time slot that is one time slot before a time slot matching the random number threshold Rt, the reader 20 can permit only the tag 10 that has detected the predetermined state to respond.

In a case in which the predetermined state is judged to have occurred, the reader 20 causes the mode to transitions from the normal mode for communicating with all the tags 10 present inside the antenna communication area to the abnormality detection mode for communicating with only the tag 10 that has detected the predetermined state such as an abnormal state using the sensor 160. In the abnormality detection mode in which a time for communicating with all the tags 10 that can respond to the reader 20 per one time is shorter than that of the normal mode, the reader 20 can increase the frequency of communicating with all the tags 10 that can respond to the reader 20. Accordingly, the reader 20 increases the frequency of communication with only the tag 10 that has detected the predetermined state such as an abnormal state using the sensor 160 and can acquire information relating to the predetermined state more in more details.

The process performed by the reader 20 described with reference to FIG. 6 can be summarized as below. The process performed by the reader 20 is a method of controlling an interrogator communicating with each of a plurality of responders each having an anti-collision function of the time slot system like the plurality of tags 10 including: a reception judging step (8220) of judging whether a response received in a time slot that has the time slot determination value Ts (predetermined value) or less in the order is present among responses from the plurality of tags 10; and a designation step (8230) of designating the number of time slots that can be selected by each of the plurality of tags 10 to be $2^{Q2}$ (predetermined reference value) or less in a case in which the response received in a time slot that has the time slot determination value Ts or less in the order is judged to be present.

According to the control method described above, in a case in which a response received in a time slot that has the time slot determination value Ts or less in the order is present among the responses from the plurality of tags 10, the reader 20 designates the number of time slots that can be selected by each of the plurality of tags 10 to be $2^{Q2}$ or less. In other words, in a case in which a response received in a time slot that has the time slot determination value Ts or less in the order is judged to be present, the reader 20 limits the tags 10 that can respond to the reader 20.

For example, in a case in which only the tag 10 that has detected the predetermined state using the sensor 160 can respond in a time slot that has the time slot determination value Ts or less in the order, the reader 20 limits a tag 10 that can respond to the reader 20 to the tag 10 that has detected the predetermined state using the sensor 160.

Accordingly, the process performed by the reader 20 has an effect of enabling the reader 20 to receive a response from the tag 10 that has detected the predetermined state using the sensor 160 with priority over a response from the tag 10 that has not detected the predetermined state using the sensor 160.

(Communication Frequency)

The tag 10 uses an electric wave of a UHF band (for example, 850 MHz or higher and, more preferably, 850 to 960 MHz) as a communication frequency.

Generally, as frequency bands for radio tags, there are a band of 13.56 MHz, a so-called UHF band around 800 MHz to 960 MHz, a band of 2.45 GHZ, and the like. Here, the communication distance of the electric wave of the UHF band can be increased more easily than the electric wave of 13.56 MHz. In addition, the electric wave of the UHF band can be wrap around an object shade more easily than the electric wave of the 2.45 GHZ band. Accordingly, in a case in which the electric wave of the UHF band is used as a communication frequency, a communication area that is a spatial area in which the reader 20 can communicate with a tag 10 can be enlarged relatively broadly. In other words, in a case in which the reader 20 and the tag 10 use modulation and reflection technologies of the UHF band, the number of tags 10 that can be simultaneously read by one reader 20 is increased to be larger than that of a case in which a frequency band such as an HF band other than the UHF band is used. For this reason, in a case in which the reader 20 and the tag 10 use the modulation and reflection technologies for the UHF band, the need for the reader 20 to receive a response from the tag 10 that has detected a predetermined state using the sensor 160 with priority among responses from a plurality of tags 10 that can respond to the reader 20 is further increased.

Accordingly, compared to a case where a frequency band such as the HF band other than the UHF band is used, the tag 10 has an effect of enabling the reader 20 that can communicate with more tags 10 to receive a response from a tag 10 that has detected a predetermined state by the sensor 160 with priority over responses from the other tags 10.

In this embodiment, the reader 20 and the tag 10 are assumed to communicate with each other using the UHF band. However, the communication frequency band between the reader 20 and the tag 10 is not limited to the UHF band. As the communication frequency band between the reader 20 and the tag 10, a frequency band of 13.56 MHz band, a 2.45 GHz band, or the like may be used as the frequency band for the RFID tag, and communication using any other frequency band that can perform radio communication may be performed.

[Modified Example]

Until now, while an example has been described in which the tag 10 and the reader 20 are respectively an RFID tag and an RFID reader/writer each having the anti-collision function of the time slot system, it is not essential that the tag 10 and the reader 20 are respectively the RFID tag and the RFID reader/writer. The communication between the tag 10 and the reader 20 may employ a TDMA or a multi-access system compliant with TDMA, and a detection result acquired by each sensor 160 may be used as a method of determining the priority level of time slots.

In addition, the detection result acquired by the sensor 160 that is a criterion that is used by the tag 10 for determining a time slot for a response of its own device is not limited to the detection of an abnormal state using the sensor 160. The tag 10 may determine a time slot used for a response of its own device in accordance with the state of the sensor 160 (for example, a detection result acquired by the sensor 160).

In addition, in the description presented until now, although an example has been described in which the reader 20 sets the Q value to one of Q1 and Q2, the Q value that can be set by the reader 20 is not limited to the two types of Q1 and Q2. The Q values that can be set by the reader 20 may be three types or more, in other words, the reader 20 may set a plurality (for example, three or more types) of priority levels for responses from a plurality of tags 10. The responses from the tag 10 are not limited to be divided into two types according to "whether or not a predetermined state has been detected", and, for example, the reader 20 may set priority levels by dividing the responses into three types as below.

In other words, the reader 20 may set priority levels by dividing responses from the tags 10 into a case in which a warning state to be urgently reported has been detected by the sensor 160, a case in which an attentive state for attracting attention has been detected, and a case in which a normal state to be reported after waiting for a report direction has been detected by the sensor 160.

[Example of Realization Using Software]

The reader 20 may be realized by an information processing program that causes a computer to function as the reader 20 and causes the computer to function as each unit (particularly, the reception judging unit 201 and the Q value designating unit 202) of the reader 20. In addition, the reader 20 may be realized by causing a computer to read a recording medium having such an information processing program recorded thereon.

In other words, the control blocks (particularly, the reception judging unit 201 and the Q value designating unit 202) of the reader 20 may be realized either by logic circuits (hardware) formed in integrated circuits (IC chips) or the like or by software using a central processing unit (CPU).

In the latter case, the reader 20 includes: a CPU executing a command of a program that is software realizing each function; a read only memory (ROM) or a storage device (these will be referred to as a recording medium) in which the program and various kinds of data are recorded in a computer (or CPU)-readable manner; a random access memory (RAM) expanding the program; and the like. Then, as the computer (or the CPU) reads the program described above from the recording medium and executes the read program, whereby the object is achieved. As the recoding medium, a non-transitory type medium such as a tape, a disk, a card, a semiconductor memory, a programmable logic circuit, or the like may be used. In addition, the program described above may be supplied to the computer through an arbitrary transmission medium (a communication network or a broadcast wave, or the like) that can transmit the program. Furthermore, one embodiment of the invention may be realized in the form of a carrier wave-embedded data signal in which the program described above is implemented through electronic transmission.

The invention is not limited to each embodiment described above, various changes can be made in a range represented in the claims, and an embodiment acquired by appropriately combining technical means disclosed in different embodiments also belongs to the technical scope of the invention.

What is claimed is:

1. An electronic tag having an anti-collision function of a time slot system, the electronic tag comprising:
    a sensor which detects a signal;
    a judging unit comprising a logical operation circuit that judges whether the signal is in a predetermined state; and
    a time slot determination unit comprising the logical operation circuit that
        determines a first time slot range for transmitting a response in response to the signal having been determined as being in the predetermined state by the judging unit;
        determines a second time slot for transmitting the response in response to the signal having been determined as not being in the predetermined state by the judging unit,
    wherein the first time slot range is earlier than the second time slot.

2. The responder according to claim 1, wherein the determination unit determines from the first time slot range a time slot selected in the case in which the sensor is judged to have detected the signal having the predetermined state by the judging unit, wherein the time slot matches a random number having a value smaller than a predetermined threshold which corresponds to a maximum of the first time slot range, and determines the time slot selected-in the case in which the sensor is judged not to have detected the predetermined state by the judging unit to be a time slot matching a random number that is the predetermined threshold or more.

3. The responder according to claim 1, further comprising the sensor.

4. The responder according to claim 2, further comprising the sensor.

5. An interrogator that has an anti-collision function of a time slot system and communicates with each of a plurality of electronic tags, the interrogator comprising:
  a hardware processor configured to implement:
    a reception judging unit that judges whether a response received in a time slot that has a predetermined reference value or less from one of the plurality of electronic tags; and
    a designation unit that designates a first range of time slots that can be selected by any of the plurality of electronic tags responders to be the predetermined reference value or less only for a case in which the response received in the time slot that has the predetermined reference value or less as judged by the reception judging unit.

6. A method of controlling an electronic tag having an anti-collision function of a time slot system, the method comprising:
  detecting a signal by using a sensor;
  judging whether the signal is in a predetermined state;
  determining a first time slot range for transmitting a response in response to the signal having been determined as being in the predetermined state; and
  determining a second time slot for transmitting the response in response to the signal having been determined as not being in the predetermined state by the judging unit, wherein the first time slot range is earlier than the second time slot.

7. A method of controlling an interrogator that has an anti-collision function of a time slot system and communicates with each of a plurality of electronic tags, the method comprising:
  judging whether a response received in a time slot that has a predetermined reference value or less from one of the plurality of responders; and
  designating a first range of time slots that can be selected by any of the plurality of electronic tags to be predetermined reference value or less only for a case in which the response received in the time slot that has the predetermined reference value or less.

8. A non-transitory computer-readable recording medium having computer-readable program stored thereon which, when executed, cause a computer to perform the method according to claim 7.

* * * * *